(12) United States Patent
Shibayama et al.

(10) Patent No.: US 11,021,598 B2
(45) Date of Patent: Jun. 1, 2021

(54) RESIN MOLDED PRODUCT, LAMINATE, AND DECORATIVE SHEET

(71) Applicant: TOPPAN PRINTING CO., LTD., Tokyo (JP)

(72) Inventors: Naoyuki Shibayama, Tokyo (JP); Toru Ookubo, Tokyo (JP); Erika Yamaguchi, Tokyo (JP); Yuichi Matsumoto, Tokyo (JP); Mami Nagashima, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/654,753

(22) Filed: Oct. 16, 2019

(65) Prior Publication Data

US 2020/0048445 A1    Feb. 13, 2020

Related U.S. Application Data

(63) Continuation of application No. PCT/JP2018/020811, filed on May 30, 2018.

(30) Foreign Application Priority Data

Jun. 2, 2017 (JP) ............................. JP2017-110294
Aug. 7, 2017 (JP) ............................. JP2017-152460
Aug. 7, 2017 (JP) ............................. JP2017-152461

(51) Int. Cl.
*C08L 23/12* (2006.01)
*B32B 19/04* (2006.01)
*B32B 27/08* (2006.01)
*B32B 27/32* (2006.01)
*C08K 5/3475* (2006.01)

(52) U.S. Cl.
CPC ............ *C08L 23/12* (2013.01); *B32B 19/045* (2013.01); *B32B 27/08* (2013.01); *B32B 27/32* (2013.01); *C08K 5/3475* (2013.01); *B32B 2264/10* (2013.01); *B32B 2307/704* (2013.01); *B32B 2307/71* (2013.01); *B32B 2451/00* (2013.01); *C08L 2201/08* (2013.01)

(58) Field of Classification Search
CPC .......... B32B 2451/00; B32B 2307/704; B32B 2307/71; B32B 2264/10; B32B 27/08; B32B 27/32; B32B 19/045; C08L 23/00; C08L 23/02; C08L 23/10; C08L 23/12; C08L 23/14; C08L 23/142; C08L 23/145; C08L 23/147; C08L 23/16; C08L 23/18; C08L 23/20; C08L 23/22; C08L 23/24; C08L 23/26; C08L 23/28; C08L 23/283; C08L 23/286; C08L 23/30; C08L 23/32; C08L 23/34; C08L 23/36; C08K 5/005; C08K 5/3475; C08K 5/3492
See application file for complete search history.

(56) References Cited

U.S. PATENT DOCUMENTS

| | | | |
|---|---|---|---|
| 5,733,956 A | 3/1998 | Lau et al. | |
| 2003/0013784 A1* | 1/2003 | Gugumus | C08K 5/005 524/99 |
| 2008/0075966 A1* | 3/2008 | Mori | B44C 3/02 428/542.2 |
| 2012/0136098 A1 | 5/2012 | Amasaki et al. | |
| 2016/0222221 A1 | 8/2016 | Saito et al. | |

FOREIGN PATENT DOCUMENTS

| | | | |
|---|---|---|---|
| JP | 11165394 A | * | 6/1999 |
| JP | H11-165394 A | | 6/1999 |
| JP | 2005-319589 A | | 11/2005 |
| JP | 2007-245442 A | | 9/2007 |
| JP | 4032829 B2 | | 1/2008 |
| JP | 2009-029089 A | | 2/2009 |
| JP | 2009-184167 A | | 8/2009 |
| JP | 2013-166889 A | | 8/2013 |
| JP | 2016-065256 A | | 4/2016 |
| JP | 2017-007156 A | | 1/2017 |

OTHER PUBLICATIONS

Choi, et al. "Role of a UV Absorber as a Matrix for Analysis of Polystyrene Using Matrix-Assisted Laser Desorption/Ionization-Mass Spectrometry", Bull. Korean Chem. Soc. 33 (9), p. 3119-3121, Sep. 20, 2012. (Year: 2012).*
BASF Tinuvin Product Brochure. May 2019. (Year: 2019).*
JPH11165394 English Machine Translation, prepared Sep. 11, 2020. (Year: 2020).*
Extended European Search Report dated May 8, 2020 for corresponding European Patent Application No. 18810513.4.
International Searching Authority, "International Search Report," issued in connection with International Patent Application No. PCT/JP2018/020811, dated Aug. 28, 2018.
International Searching Authority, "Written Opinion," issued in connection with International Patent Application No. PCT/JP2018/020811, dated Aug. 28, 2018.

* cited by examiner

*Primary Examiner* — Christopher M Rodd
(74) *Attorney, Agent, or Firm* — Foley & Lardner LLP

(57) ABSTRACT

A resin molded product, a laminate, and a decorative sheet having high weatherability. A decorative sheet includes a resin molded product as a protective layer, and the resin molded product includes an ultraviolet absorber having pKa of −5.5 or more and −4.5 or less when irradiated with light, and a photostabilizer having pKa of 3.0 or more and 7.0 or less. The added amount of each of the ultraviolet absorber and the photostabilizer is 3.0 parts by mass or less per 100 parts by mass of the resin.

16 Claims, 1 Drawing Sheet

RESIN MOLDED PRODUCT, LAMINATE, AND DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/020811, filed on May 30, 2018, which is based upon and claims the benefit of priority to and to Japanese Patent Applications Nos. 2017-110294, filed on Jun. 2, 2017; 2017-152460, filed on Aug. 7, 2017; 2017-152461, filed on Aug. 7, 2017, the disclosures of which are all incorporated herein by reference in their entireties.

TECHNICAL FIELD

The present invention relates to a resin molded product, a laminate, and a decorative sheet provided with these and used for interior decoration materials of buildings, exterior decoration materials for front doors or the like, surface materials for fixtures, surface materials for home appliances, and the like.

BACKGROUND ART

In recent years, olefin resin decorative sheets have been proposed as alternatives to polyvinyl chloride decorative sheets. These decorative sheets are used for interior decoration materials of housings and public facilities, exterior decoration materials for front doors or the like, surface materials for fixtures, and surface materials for home appliances. Since these decorative sheets may be exposed to direct sunlight, wind, or rain on a daily basis, high weatherability is required (for example, see PTL 1).

PTL 1 describes a decorative sheet which contains a photostabilizer, an ultraviolet absorber, and the like in a resin layer made of olefin resin (for example, protective layer) to thereby improve weatherability.

CITATION LIST

Patent Literature

PTL 1: JP 4032829 B2

SUMMARY OF THE INVENTION

Technical Problem

When a resin layer contains an ultraviolet absorber and a photostabilizer, chemical structures of the ultraviolet absorber and the photostabilizer in the resin composition are deteriorated and reduced in molecular weight due to long-term use. This often leads to bleed out, by which decomposed components of the ultraviolet absorber and the photostabilizer come out onto the surface of the resin layer. Further, this may also cause problems such as reduction in adhesiveness to other resin layers, and stickiness due to the decomposed components that have bled out on the surface layer.

The present invention has been made in view of the above issues, and is directed to provide resin molded products, laminates, and decorative sheets with improved weatherability.

Solution to Problem

The present inventors have found a way to produce decorative sheets while avoiding decomposition of ultraviolet absorbers and photostabilizers and without reduction in quality for an extended period of time. The present invention is based on the above knowledge of the present inventors.

An aspect of the present invention is a resin molded product including: (a) an olefin resin as a main component; (b) an ultraviolet absorber having pKa of −5.5 or more and −4.5 or less when irradiated with light; and a photostabilizer having pKa of 3.0 or more and 7.0 or less, wherein (c) an added amount of each of the ultraviolet absorber and the photostabilizer is 3.0 parts by mass or less per 100 parts by mass of the olefin resin.

Further, another aspect of the present invention is a resin molded product including: (a) an olefin resin as a main component; an ultraviolet absorber; and a photostabilizer, wherein (b) a difference between pKa of the ultraviolet absorber when irradiated with light, which is a negative value, and pKa of the photostabilizer, which is a positive value, is in a range of 8.0 or more and 12.0 or less, and (c) an added amount of each of the ultraviolet absorber and the photostabilizer is 3.0 parts by mass or less per 100 parts by mass of the olefin resin.

Further, another aspect of the present invention is a resin molded product including: a resin layer including (a) an olefin resin as a main component, (b) an ultraviolet absorber having pKa of −5.5 or more and −4.5 or less when irradiated with light, and a photostabilizer having pKa of 3.0 or more and 7.0 or less, wherein (c) an added amount of each of the ultraviolet absorber and the photostabilizer is 3.0 parts by mass or less per 100 parts by mass of the olefin resin; and (d) an acid modified resin layer provided on one surface of the resin layer.

Further, another aspect of the present invention is a resin molded product including: a resin layer including (a) an olefin resin as a main component, an ultraviolet absorber, and a photostabilizer, wherein (b) a difference between pKa of the ultraviolet absorber when irradiated with light, which is a negative value, and pKa of the photostabilizer, which is a positive value, is in a range of 8.0 or more and 12.0 or less, and (c) an added amount of each of the ultraviolet absorber and the photostabilizer is 3.0 parts by mass or less per 100 parts by mass of the olefin resin; and (d) an acid modified resin layer provided on one surface of the resin layer.

Further, another aspect of the present invention is a laminate including (a) a plurality of resin layers, wherein (b) a photostabilizer having pKa of 4.0 or more and 7.0 or less is included in a top coat layer which is disposed on an outermost surface of the laminate.

Further, another aspect of the present invention is a decorative sheet including a resin molded product including: a resin layer including (a) an olefin resin as a main component, (b) an ultraviolet absorber having pKa of −5.5 or more and −4.5 or less when irradiated with light, and a photostabilizer having pKa of 3.0 or more and 7.0 or less, wherein (c) an added amount of each of the ultraviolet absorber and the photostabilizer is 3.0 parts by mass or less per 100 parts by mass of the olefin resin; and (d) an acid modified resin layer provided on one surface of the resin layer.

Further, another aspect of the present invention is a decorative sheet including a resin molded product including: a resin layer including (a) an olefin resin as a main component, an ultraviolet absorber, and a photostabilizer, wherein (b) a difference between pKa of the ultraviolet absorber when irradiated with light, which is a negative value, and pKa of the photostabilizer, which is a positive value, is in a range of 8.0 or more and 12.0 or less, and (c) an added amount of each of the ultraviolet absorber and the photostabilizer is 3.0 parts by mass or less per 100 parts by mass of the olefin resin; and (d) an acid modified resin layer provided on one surface of the resin layer.

Further, another aspect of the present invention is a decorative sheet including the aforementioned laminate.

Advantageous Effects of Invention

According to an aspect of the present invention, a resin molded product, a laminate, and a decorative sheet that have improved weatherability over a long period of time can be provided.

DETAILED DESCRIPTION OF REPRESENTATIVE EMBODIMENTS

Figure 1:
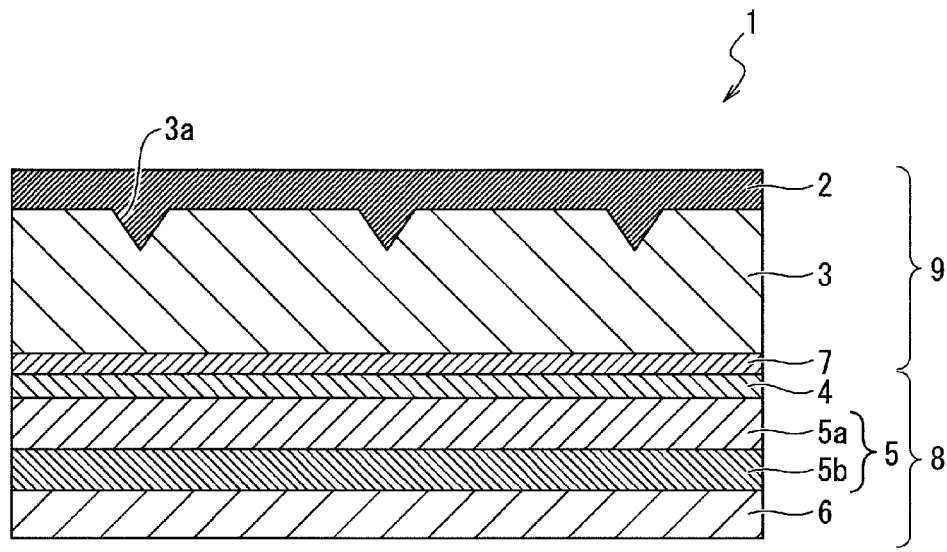
FIG. 1 is a cross-sectional view illustrating a configuration of a decorative sheet according to first and second embodiments of the present invention.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First and second embodiments of the present invention will be described with reference to the drawings.

The drawing is schematic, and the relationship of the thickness and the planar dimensions, the ratios of the thicknesses of the layers, and the like are different from the actual ones. The embodiment described below is merely an example of the configurations for embodying the technical idea of the present invention, and the technical idea of the present invention should not limit the materials, shapes, structures, and the like of the components to those described below. The technical idea of the present invention can be modified in various ways within the technical scope defined by the claims.

First Embodiment (Resin Molded Product)

A resin molded product of the first embodiment is a resin layer whose main component is an olefin resin. Further, the main component described herein refers to 70 mass % or more, and preferably 90 mass % or more of the material constituting the layer. On one surface (one of the front surface and rear surfaces) of the resin layer, an acid modified resin layer whose main component is an acid modified resin may be provided. The resin molded product of the first embodiment, when used for a decorative sheet, functions as a "protective layer" as described above. Further, the acid modified resin layer functions as an "adhesive layer" as described above. Hereinafter, the "resin molded product" may also be referred to as a "protective layer." Further, the "acid modified resin layer" may also be referred to as an "adhesive resin layer."

In the resin molded product of the first embodiment, the resin layer described above includes an ultraviolet absorber and a photostabilizer. The ultraviolet absorber, when irradiated with light, has a negative pKa value, specifically, in the range of −5.5 or more and −4.5 or less. On the other hand, the photostabilizer has a positive pKa value, specifically, in the range of 3.0 or more and 7.0 or less. Further, the added amount of the ultraviolet absorber and the photostabilizer is 3.0 parts by mass or less per 100 parts by mass of the olefin resin, which is the main component of the above resin layer. Moreover, regardless of the respective numerical ranges of pKa of the ultraviolet absorber and the photostabilizer, the difference between pKa of the ultraviolet absorber when irradiated with light and pKa of the photostabilizer is in the range of 8.0 or more and 12.0 or less.

<Ultraviolet Absorber>

The ultraviolet absorber is a compound (1) having a hydroxyphenyl triazine skeleton or a compound (2) having a benzotriazole skeleton. These are preferably compounds having a maximum absorption in the range of 270 nm or more and 400 nm or less. Furthermore, the ultraviolet absorber is excited by absorbing light, which causes migration of hydrogen atoms within the molecule, depending on the skeleton. These return to their ground state by releasing heat. This can be represented by reaction formulas (3) and (4).

[Chemical Formula 1]

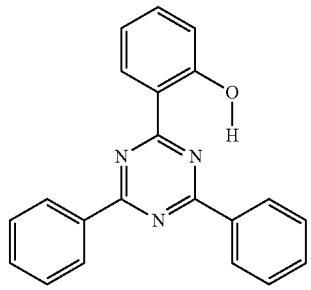

(1)

[Chemical Formula 2]

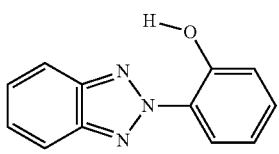

(2)

[Chemical Formula 3]

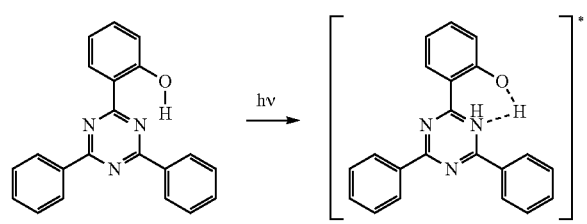

(3)

[Chemical Formula 4]

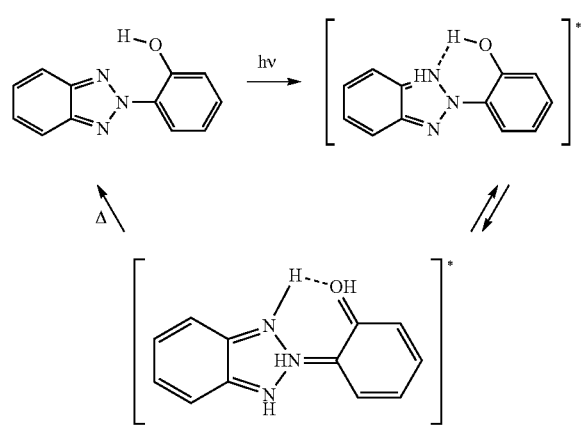

(4)

[Chemical Formula 5]

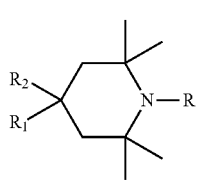

(5)

Examples of the compound having a hydroxyphenyl triazine skeleton include 2-(2-hydroxy-4-octoxyphenyl)-4,6-bis(2,4-dimethylphenyl)-s-triazine, 2-(2-hydroxy-4-hexyloxyphenyl)-4,6-diphenyl-s-triazine, 2-(2-hydroxy-4-propoxy-5-methylphenyl)-4,6-bis(2,4-dimethylphenyl)-s-triazine, 2-[2-hydroxy-4-(3-dodecyloxy-2-hydroxypropyloxy)phenyl]-4,6-bis(2,4-dimethylphenyl)-s-triazine, 2-[2-hydroxy-4-(3-tridecyloxy-2-hydroxypropyloxy) phenyl]-4,6-bis(2,4-dimethylphenyl)-s-triazine, 2-[2-hydroxy-4-[3-(2-ethylhexyloxy)-2-hydroxypropyloxy]phenyl]-4,6-bis(2,4-dimethylphenyl)-s-triazine, 2-(2-hydroxy-4-hexyloxyphenyl)-4,6-dibiphenyl-s-triazine, 2-[2-hydroxy-4-[1-(i-octyloxycarbonyl) ethyloxy]phenyl]-4,6-dibiphenyl-s-triazine, 2,4-bis(2-hydroxy-4-octoxyphenyl)-6-(2,4-dimethylphenyl)-s-triazine, 2,4-bis(4-butoxy-2-hydroxyphenyl)-6-(2,4-dibutoxyphenyl)-s-triazine, 2,4,6-tris(2-hydroxy-4-octoxyphenyl)-s-triazine, 2,4-bis(2,4-dimethylphenyl)-6-(2-hydroxy-4-n-octyloxyphenyl)-1,3,5-triazine (product name: CYASORB (registered trademark) UV-1164), and 2,4,6-tris(2-hydroxy-4-hexyloxy-3-methylphenyl)-1,3,5-triazine (product name: LA-F70).

Examples of the compound having a benzotriazole skeleton include 2-(2'-hydroxy-5'-methyl phenyl) benzotriazole, 2-(2'-hydroxy-5'-t-butylphenyl) benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3'-t-butyl-5'-(2-(octyloxycarbonyl)ethyl)phenyl)-5-chlorobenzotriazole, 2-(2'-hydroxy-3'-dodecyl-5'-methylphenyl)-5-chlorobenzotriazole, 2-(2'-hydroxy-3',5'-di-t-amyl phenyl)benzotriazole, 2-(2'-hydroxy-5'-t-octylphenyl) benzotriazole, 2-(2'-hydroxy-3',5'-di-(dimethylbenzyl)phenyl)benzotriazole, 2-(2'-hydroxy-4'-octyloxyphenyl)benzotriazole, 2,2'-methylene-bis(2-(2'-hydroxy-5'-t-octylphenyl)benzotriazole, 2-(2'-hydroxy-3'-(3,4,5,6-tetrahydrophthalimidylmethyl)-5'-methylbenzyl)phenyl)benzotriazole, 2-(5-chloro-2H-benzotriazole-2-yl)-6-tert-butyl-4-methylphenol (product name: LA-36), and 2-(5-chloro-2-benzotriazolyl)-6-tert-butyl-p-cresol (product name: Tinuvin (registered trademark) 326).

<Photostabilizer>

The photostabilizer is a hindered amine-based compound (5), and the hindered amine-based compound can capture the radicals by the reaction of the reaction formula (6).

[Chemical Formula 6]

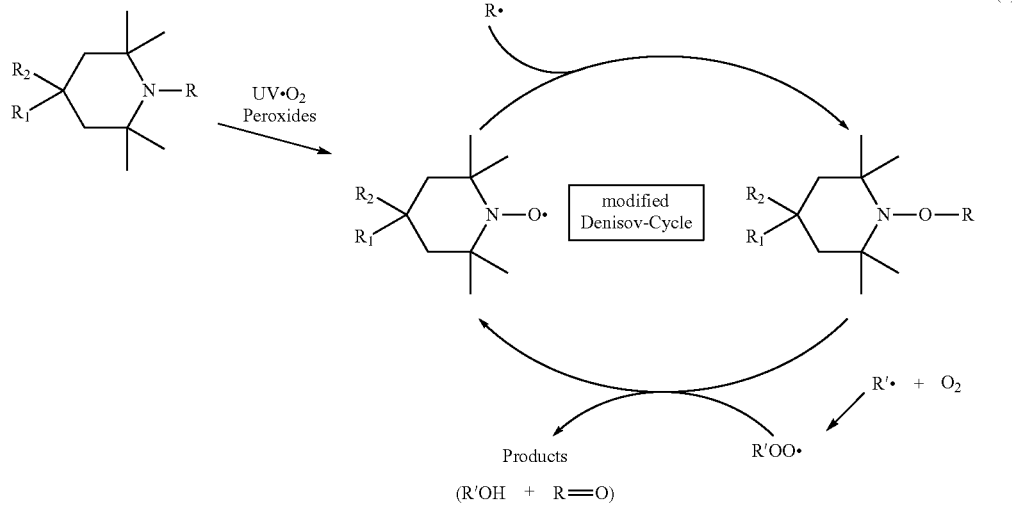

(6)

Examples of the hindered amine-based photostabilizer include bis(2,2,6,6-tetramethylpiperidin-4-yl)sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl)n-butyl3,5-di-tert-butyl 4-hydroxy benzylmalonate; the condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanoate; 1,2,2,6,6-pentamethylpiperidin-4-yl stearate; 1,2,2,6,6-pentamethylpiperidin-4-yl dodecanoate; the condensate of N,N'-bis(2,2,6,6-tetramethylpiperidin-4-yl)hexamethylene diamine and 4-tert-octylamino-2,6-dichloro-1,3,5-triazine; tris(2,2,6,6-tetramethylpiperidin-4-yl)nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl2-(2-hydroxy-3,5-di-tert-butylbenzyl)malonate; 3-n-octyl-7,7,9,9-tetramethyl-1,3,8-triazaspiro[4.5]decane-2,4-dione; bis(1-octyloxy-2,2,6,6-tetramethylpiperidyl)sebacate; bis(1-octyloxy-2,2,6,6-tetramethylpiperidyl)succinate; the condensate of N,N'-bis(2,2,6,6-tetramethylpiperidin-4-yl)hexamethylene diamine and 4-morpholino2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidine-2,5-dione; 3-dodecyl-1-(1-ethanoyl-2,2,6,6-tetramethylpiperidin-4-yl)pyrrolidine-2,5-dione; 3-dodecyl-1-(1,2,2,6,6-pentamethylpiperidin-4-yl)pyrrolidine-2,5-dione; the mixture of 4-hexadecyloxy- and 4-stearyloxy-2,2,6,6-tetramethylpiperidine; the condensate of N,N'-bis(2,2,6,6-tetramethylpiperidin-4-yl)hexamethylene diamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperazinyl-triazine; and the reaction product of 7,7,9,9-tetramethyl-2-cycloundecyl-1-oxa-3,8-diaza-4-oxospiro[4.5]decane and epichlorohydrin.

Further, examples of the N-alkoxy hindered amine-based photostabilizer include tetrakis (2,2,6,6-tetramethyl-4-piperidyl) butane-1,2,3,4-tetracarboxylate; 1,2,3,4-butanetetracarboxylic acid tetrakis (1,2,2,6,6-pentamethyl-4-piperidinyl) ester; 1,2,3,4-butanetetracarboxylic acid 1,2,2,6,6-pentamethyl-4-piperidinyl tridecyl ester; 1,2,3,4-butanetetracarboxylic acid 2,2,6,6-tetramethyl-4-piperidinyl tridecyl ester; 1,2,2,6,6-pentamethyl-4-piperidinyl ester of the polymer of 1,2,3,4-butanetetracarboxylic acid and 2,2,6,6-tetramethyl-2,4,8,10-tetraoxaspiro[5.5]undecane3,9-diethanol; 2,2,6,6-tetramethyl-4-piperidinyl ester of the polymer of 1,2,3,4-butanetetracarboxylic acid and 2,2,6,6-tetramethyl-2,4,8,10-tetraoxaspiro[5.5]undecane3,9-diethanol; and carbonic acid bis (1-undecaneoxy-2,2,6,6-tetramethylpiperidin-4-yl).

Further, examples of the hydroxyl-substituted N-alkoxy-HALS include 1-(2-hydroxy-2-methylpropoxy)-2,2,6,6-tetramethyl-4-piperidinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yl oxy)-2-octadecanoyloxy-2-methylpropane; 1-(2-hydroxyethyl)-2,2,6,6-tetramethyl-4-piperidinol; and the reaction product of 1-(2-hydroxyethyl)-2,2,6,6-tetramethyl-4-piperidinol and dimethyl succinate.

Among these hindered amine-based photostabilizers, examples of commercially available products include Tinuvin 123, Tinuvin 152, Tinuvin NOR 371 FF, Tinuvin XT 850 FF, Tinuvin XT 855 FF, Tinuvin 5100, Tinuvin 622 SF, and Flamestab NOR 116 FF manufactured by BASF JAPAN Co. Ltd., and ADK STAB LA-81 manufactured by ADEKA corporation. These may be used alone or in combination of two or more thereof.

[Added Amount]

When the ultraviolet absorber and the photostabilizer are added to the protective layer, it is preferred to add 0.1 to 3.0 parts by mass of each of the ultraviolet absorber and the photostabilizer per 100 parts by mass of the olefin resin, which is the main component of the protective layer. More preferably, the amount is in the range of 0.2 to 2.0 parts by weight. When the added amount of the ultraviolet absorber and the photostabilizer is less than 0.1 parts by mass, stability of the resin to ultraviolet radiation may be poor. On the other hand, when the added amount is larger than 3.0 parts by mass, bleed out is more likely to occur.

[Mass Ratio]

A mass ratio A of the photostabilizer to the ultraviolet absorber in the olefin resin is preferably 0.5≤A≤2. More preferably, the ratio is 1≤A≤1.5. This is because the stability of the ultraviolet absorber is increased when the added amount of the photostabilizer is larger than the added amount of the ultraviolet absorber. Accordingly, the stability of the ultraviolet absorber contributes to improvement in the weatherability of the olefin resin.

When the resin molded product is used in a decorative sheet, it is preferred to form an embossed pattern by embossing or the like on the resin molded product which serves as a protective layer, and embed a top coat layer into the recesses of the embossed pattern. In this case, the top coat layer is provided on the surface of the protective layer preferably by wiping, by which the recesses of the embossed pattern are filled with the top coat layer.

Further, when an ink layer is provided as an underlayer of the protective layer, the ink layer preferably includes a photostabilizer. The photostabilizer is preferably a hindered amine-based material. Providing the photostabilizer in the ink layer can prevent radicals generated by degradation of the binder resin itself which forms the ink layer or the resin of other layers from reducing the chemical components of the ink pigment, and thereby prevent discoloration of the pigment. Accordingly, a vivid color pattern can be maintained over a long period of time.

(Decorative Sheet)

Referring to FIG. 1, a specific example of a decorative sheet 1 of the first embodiment will be described.

The decorative sheet 1 shown in FIG. 1 includes a primary film layer 6 constituting a substrate layer, and an ink layer 5, an adhesive layer 4, a protective layer 3, and a top coat layer 2, which are disposed in this order on the primary film layer 6. An embossed pattern 3a which forms an embossed pattern is formed on the upper surface of the protective layer 3. The embossed pattern may be formed by methods other than embossing.

The decorative sheet 1 is composed of, for example, a laminate 8 in which the adhesive layer 4 is provided on a primary film resin sheet, which is the primary film layer 6 on which the ink layer 5 is formed, and a laminate 9 in which the protective layer 3 containing an ultraviolet absorber having pKa in the range of −5.5 or more and −4.5 or less when irradiated with light and a photostabilizer having pKa in the range of 3.0 or more and 7.0 or less is co-extruded with the adhesive resin layer 7, which are bonded to each other by dry lamination, extrusion lamination, or the like. The adhesive resin layer 7 may not necessarily be formed. Further, the laminate 9 may include at least the protective layer 3 and the top coat layer 2.

The details of each layer will now be described.

[Top Coat Layer]

On the outermost surface of the decorative sheet 1, the top coat layer 2 is provided for surface protection and gloss control. The resin materials for the main component of the top coat layer 2 may be, for example, polyurethane, acrylic silicone, fluorine, epoxy, vinyl, polyester, melamine, aminoalkyd, and urea-based resin materials or the like. The form of the resin materials is not limited, and may be, for example, an aqueous, emulsion, or solvent type. The curing method may be appropriately selected from a one-part type, a two-part type, an ultraviolet curing method, and the like.

Figure 2:
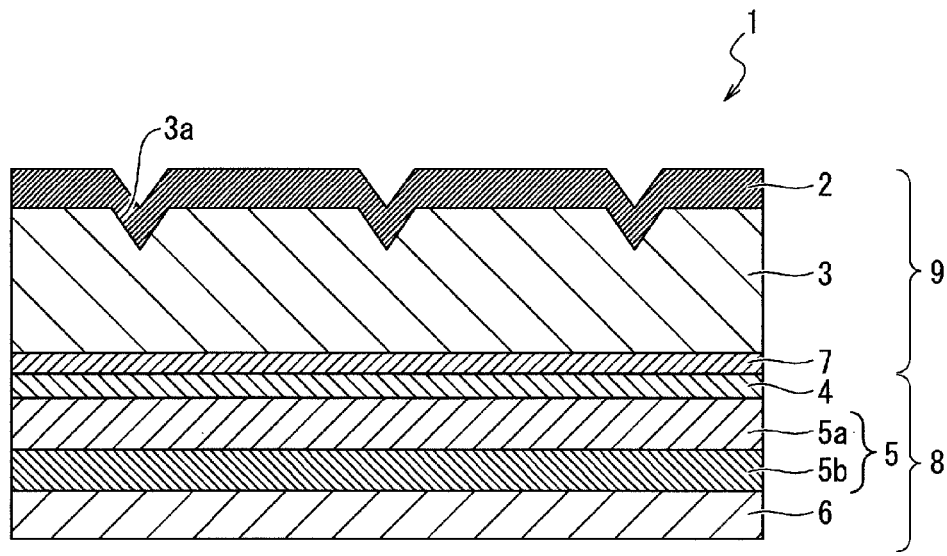
FIG. 2 is a cross-sectional view illustrating a configuration of a decorative sheet according to a modified example.

In FIG. 1, the top coat layer 2 is embedded in the recesses of the embossed pattern 3a of the protective layer 3. Since the top coat layer 2 is embedded in the recesses of the embossed pattern 3a, high weatherability can be maintained by the embedded top coat layer 2 at the recesses having a decreased thickness of the protective layer. The top coat layer 2 is embedded in the recesses by wiping, in which a coating liquid of the resin composition is applied and wiped off by using a squeegee or the like. Further, as shown in FIG. 2, the top coat layer 2 may not be embedded in the recesses of the embossed pattern 3a. Further, the top coat layer 2 may also be provided to cover the entire surface of the protective layer 3. By providing the top coat layer 2 covering the entire surface, a decorative sheet 1 having further improved weatherability can be provided.

The resin materials used as the main component of the top coat layer 2 preferably include urethane-based ones having isocyanate in view of workability, cost, cohesive force of the resin itself, and the like. The isocyanate may be appropriately selected from adduct, biuret, and isocyanurate curing agents, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), bis (isocyanatomethyl) cyclohexane (HXDI), trimethylhexamethylene diisocyanate (TMDI), and the like. In view of weatherability, curing agents based on hexamethylene diisocyanate (HMDI) or isophorone diisocyanate (IPDI) having a linear molecular structure are preferred.

In addition, in order to improve surface hardness, resins curable with ionizing radiation, such as ultraviolet and electron beams, are preferably used. Known materials including various monomers and commercially available oligomers can be used as the main materials. For example, polyfunctional monomers such as pentaerythritol triacrylate (PET3A), pentaerythritol tetraacrylate (PET4A), trimethylolpropane triacrylate (TMPTA), and dipentaerythritol hexaacrylate (DPHA), polyfunctional oligomers such as Shikoh UV-1700B (manufactured by the Nippon Synthetic Chemical Industry Co., Ltd.), and a mixture thereof are preferably used.

Moreover, these resins may be used in combination. For example, use of a hybrid of thermally curable resin and a photo-curable resin can improve surface hardness, reduce cure shrinkage, and enhance adhesion.

[Protective Layer]

The protective layer 3 constitutes a substrate of the top coat layer 2, or, when the ink layer 5 is provided, a transparent resin layer that protects the ink layer 5. The protective layer 3 may have transparency that allows the ink layer 5 to be viewed. A resin material used as the main component of the protective layer 3 is preferably an olefin resin. Examples of the olefin resin include polypropylene, polyethylene, and polybutene; as well as those obtained by homopolymerization or copolymerization of two or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene); and those obtained by copolymerization of ethylene or α-olefins with other monomers, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, and an ethylene-butyl acrylate copolymer. Further, in order to improve the surface hardness of the decorative sheet 1, highly crystalline polypropylene is preferably used.

Furthermore, various functional additives such as thermal stabilizer, photostabilizer, blocking agent, catalyst scavenger, coloring agent, light scattering agent, and gloss control agent can be added as necessary to the resin composition constituting the protective layer 3. These functional additives can be suitably selected from known additives.

The embossed pattern 3a is provided to improve designability. The embossed pattern 3a can be formed, for example, by applying heat and pressure by using an embossed plate having an embossed pattern prior to formation of the top coat layer 2. Alternatively, for example, a cooling roll on which an embossed pattern is provided can be used in film formation by using an extruder so that the embossed pattern 3a is formed simultaneously with cooling of the sheet.

[Adhesive Resin Layer]

When non-polar polypropylene is used for the protective layer 3, the adhesive resin layer 7 is preferably provided if the protective layer 3 and the resin layer (ink layer 5) provided on the underside thereof have low adhesiveness to each other. The adhesive resin layer 7 is preferably made of resins such as those based on polypropylene, polyethylene, acrylic, and modified with acid (i.e. an acid modified resin). The layer thickness of the adhesive resin layer 7 is in the range of 2 µm or more and 20 µm or less in view of adhesiveness and heat resistance. Further, the adhesive resin layer 7 is preferably formed by co-extrusion with the protective layer 3 in view of improvement in adhesion strength.

[Adhesive Layer]

As shown in FIG. 1, on the underside of the protective layer 3, the adhesive layer 4 is provided to improve adhesiveness between the ink layer 5 located thereunder and the protective layer 3. The material for the adhesive layer 4 is not specifically limited, and can be appropriately selected from acrylic, polyester, polyurethane and epoxy-based adhesives and the like. A method of applying the adhesive can be appropriately selected depending on the viscosity of the adhesive and the like, and gravure coating is typically used. After being applied by gravure coating on the ink layer 5 on the surface of the primary film layer 6, the adhesive layer 4 is laminated on the protective layer 3 and the adhesive resin layer 7. The adhesive layer 4 may be omitted when the adhesiveness between the protective layer 3 and the ink layer 5 is sufficient.

[Ink Layer]

The ink layer 5 is provided on the underside of the adhesive layer 4. The ink layer 5 is made of ink and includes a pattern layer 5a that imparts designability to the decorative sheet 1. The ink layer 5 further includes a solid ink layer 5b having concealability on the underside of the pattern layer 5a.

For the ink constituting the pattern layer 5a, nitrocellulose, cellulose, vinyl chloride-vinyl acetate copolymer, polyvinyl butyral, polyurethane, acrylic, polyester, and modified products thereof can be appropriately selected as a binder. The binder is not specifically limited to aqueous, solvent, or emulsion type. The curing method may be a one-part type, or a two-part type which uses a curing agent. Further, the ink can be cured by ionizing radiation such as ultraviolet and electron beams. In particular, the most typical method is use of urethane-based ink cured by isocyanate. In addition to these binders, coloring agent such as pigment and dye, extender pigment, solvent, and various additives contained in general ink may be included. Examples of highly versatile pigments include condensed azo pigments, insoluble azo pigments, quinacridones, isoindolines, anthraquinones, imidazolones, cobalt, phthalocyanines, carbon, titanium oxide, iron oxide, pearl pigments such as mica, and the like.

The solid ink layer 5b may be formed by using an ink made of the same material as that of the ink used for the pattern layer 5a. When an ink used for the pattern layer 5a is made of a transparent material, an opaque pigment, iron oxide, titanium oxide, or the like can be added to the ink. In addition, metals such as silver, copper, and aluminum can be added to impart concealing properties. Typically, aluminum flakes are used. Further, the solid ink layer 5b may be omitted.

The ink layer 5 can be formed by various printing methods, such as gravure printing, offset printing, screen printing, flexographic printing, electrostatic printing, and ink jet printing, directly on the primary film layer 6. Further, when a metal is added to impart concealing properties, a comma coater, knife coater, lip coater, metal deposition, or sputtering is preferably used.

Further, taking into consideration the adhesiveness of an interface on which a resin material or ink is applied, the surface to be applied is preferably processed with a treatment such as a corona treatment, ozone treatment, plasma treatment, electron beam treatment, ultraviolet treatment, or bichromate treatment before the resin material or ink is applied so that the surface is activated before the lamination process of the resin material or ink to thereby improve adhesiveness between the layers.

[Primary Film Layer]

The primary film layer 6, which is a substrate layer, is provided on the underside of the ink layer 5. The primary film layer 6 can be appropriately selected from paper such as thin paper, titanium paper, and resin impregnated paper, synthetic resin such as polyethylene, polypropylene, polystyrene, polybutylene, polycarbonate, polyester, polyamide, ethylene-vinyl acetate copolymer, polyvinyl alcohol, and acrylic, foams of these synthetic resins, a rubber such as ethylene-propylene copolymer rubber, ethylene-propylene-diene copolymer rubber, styrene-butadiene-styrene block copolymer rubber, and polyurethane, an organic or inorganic nonwoven fabric, synthetic paper, and foil of metal such as aluminum, iron, gold, and silver.

[Other Layers]

Further, when an olefin resin is used as the primary film layer 6, a primer layer (not shown) is preferably provided between the primary film layer 6 and a substrate (not shown) to which the decorative sheet 1 is bonded since the surface of the primary film layer 6 may be often inert. In addition, in order to improve adhesiveness between the primary film layer 6 made of an olefin resin and the substrate, the underside of the primary film layer 6 is preferably processed with a treatment such as a corona treatment, plasma treatment, ozone treatment, electron beam treatment, ultraviolet treatment, or bichromate treatment. Further, although the primer layer may be made of the same material as that of ink used for the pattern layer 5a, inorganic fillers such as silica, alumina, magnesia, titanium oxide and barium sulfate are preferably included to avoid blocking and improve adhesiveness to the adhesive, considering web handling of the decorative sheet 1.

In the decorative sheet 1 of the first embodiment, the primary film layer 6 is preferably in the range of 20 to 150 μm thickness considering print workability, cost, and the like, the adhesive layer 4 is in the range of 1 to 20 μm thickness, the protective layer 3 is in the range of 20 to 200 μm thickness, and the top coat layer 2 is in the range of 3 to 20 μm thickness, and the total thickness of the decorative sheet 1 is preferably in the range of 45 to 400 μm.

It is known that the stability may be increased when the ultraviolet absorber and the photostabilizer are used in combination rather than when they are used alone. On the other hand, the criteria and reasons of the combination is unknown. The ultraviolet absorber and the photostabilizer are preferably present in close proximity since they require intermolecular interaction. Here, the interaction between the ultraviolet absorber having a triazine skeleton or benzotriazole skeleton and the photostabilizer having a hindered amine skeleton will be described. In general, an intermolecular interaction between the ultraviolet absorber and the photostabilizer is generated between a conjugated system in the ultraviolet absorber and a hindered amine skeleton in the photostabilizer. When absorbing light, the ultraviolet absorber has a high probability of forming an intramolecular hydrogen bond to the nitrogen of the triazine skeleton or benzotriazole skeleton. In other words, the hydrogen in the hydroxyl group is likely to be dissociated.

When the photostabilizer included together with the ultraviolet absorber has the pKa larger than 7.0, the ultraviolet absorber which has absorbed light and is in an excited state is likely to cause a side reaction via an acid-base reaction with the photostabilizer. That is, the ultraviolet absorber and the photostabilizer fail to undergo reactions of the reaction formula (3), the reaction formula (4), and the reaction formula (6), which should have occurred, and side reaction is increased. In other words, decomposition by light is promoted, leading to a decrease in weatherability. On the other hand, when the photostabilizer having the pKa of 7.0 or less is used, the ultraviolet absorber and the photostabilizer are likely to undergo reactions of the reaction formula (3), the reaction formula (4), and the reaction formula (6) since an acid-base reaction with the hydrogen in the hydroxyl group in the ultraviolet absorber which has absorbed light and is in an excited state is less likely to occur. Therefore, weatherability against light can be improved.

In view of the above, the first embodiment can provide the protective layer 3 (resin molded product) and the decorative sheet 1 having high weatherability by adding the ultraviolet absorber having the pKa in the range of −5.5 or more and −4.5 or less when irradiated with light, and the photostabilizer having the pKa in the range of 3.0 or more and 7.0 or less in the olefin resin composition which constitutes the protective layer 3.

Further, in the first embodiment, since the ultraviolet absorber having the pKa in the range of −5.5 or more and −4.5 or less when irradiated with light and the photostabilizer having the pKa in the range of 3.0 or more and 7.0 or less are contained in the olefin resin in the protective layer, it is possible to further prevent reduction in weatherability when an acid modified resin (acid modified olefin resin) is provided as an adhesive resin layer 7 on the protective layer 3. The reason for this is that, when the photostabilizer has a pKa larger than 7.0, a side reaction is likely to occur due to an acid base reaction in the proximity of the protective layer 3 in contact with the adhesive resin layer 7, and the ratio of the photostabilizer in the protective layer 3 tends to be decreased. Therefore it is preferred to use the photostabilizer having a pKa of 7.0 or less.

(Method of Measuring pKa of Ultraviolet Absorber Upon Light Absorption)

The ultraviolet absorber was dissolved in acetonitrile so that the absorbance at the maximum absorption wavelength became 1, and bubbling with nitrogen was performed for 15 minutes. Then, 70% perchloric acid was dropped into the solution to change the pH of the solution. At that time, the absorption spectrum of the solution was measured, and, from the absorbance at λmax, the ultraviolet absorber at each pH and the ultraviolet absorber in which hydrogen ion is added to the nitrogen of the benzotriazole skeleton or triazine skeleton of the ultraviolet absorber were obtained. From the point where these values become equal, pKa of the ultraviolet absorber upon light absorption was determined. Measurement of the absorption spectrum was performed by using a U-4000 spectrophotometer manufactured by Hitachi High-Technologies Corporation.

Second Embodiment

With reference to the drawings, a second embodiment of the present invention will be described. An overall configuration of the decorative sheet 1 of the second embodiment is the same as that of the decorative sheet 1 of the first embodiment shown in FIG. 1. The same components as those of the first embodiment are denoted by the same reference numerals, and the details thereof are omitted.

The decorative sheet 1 of the second embodiment differs from the decorative sheet 1 of the first embodiment in that the top coat layer 2 shown in FIG. 1 includes a photostabilizer having pKa in the range of 4.0 or more and 7.0 or less. Further, in the decorative sheet 1 of the second embodiment, the top coat layer 2 may be composed of a plurality of layers, for example, two layers including a thermosetting layer mainly composed of a thermosetting resin and a photocurable layer mainly composed of a photocurable resin such as a UV curable resin. With this configuration composed of two curable layers, the surface hardness of the decorative sheet 1 can be improved. Preferably, the photocurable layer is provided on the front surface side. When the top coat layer 2 is composed of a plurality of layers, a photostabilizer having a pKa in the range of 4.0 or more and 7.0 or less is preferably contained in each layer. Alternatively, a photostabilizer having a pKa in the range of 4.0 or more and 7.0 or less may also be contained in at least one layer of the plurality of layers forming the top coat layer 2.

The photostabilizer is preferably the same hindered amine-based photostabilizer (the above-mentioned hindered amine-based compound (5)) as the photostabilizer included in the protective layer 3 of the first embodiment. In particular, a hindered amine-based photostabilizer having an amino ether group and a molecular weight of 600 or more is more preferred. The molecular weight of the photostabilizer may be measured by, for example, number-average molecular weight.

Further, when the photostabilizer is composed of a single substance, a value derived from the structural formula of the substance, if the structure is known, can be used as the molecular weight of the photostabilizer.

When the photostabilizer is contained in the top coat layer 2, the added amount of the photostabilizer is preferably in the range of 0.1 parts by mass or more and 5.0 parts by mass or less per 100 parts by mass of the resin of the layer to which the photostabilizer is added. More preferably, the amount is in the range of 0.3 parts by mass or more and 3.0 parts by mass or less. When the compounding amount of the photostabilizer is less than 0.1 parts by mass, stability of the resin to the generated radicals may be poor. On the other hand, when the compounding amount of the photostabilizer is larger than 5.0 parts by mass, bleed out is more likely to occur.

Further, in addition to the photostabilizer, an ultraviolet absorber and a gloss adjusting agent are preferably contained in the top coat layer 2. When an ultraviolet absorber is contained in the top coat layer 2, the pKa of the ultraviolet absorber is preferably in the range of −5.5 or more and −4.5 or less when irradiated with light.

When the top coat layer 2 is composed of a plurality of layers, an ultraviolet absorber having a pKa in the range of −5.5 or more and −4.5 or less when irradiated with light is preferably contained in each layer. Alternatively, such an ultraviolet absorber may also be contained in at least one layer of the plurality of layers forming the top coat layer 2.

When the ultraviolet absorber is contained in the top coat layer 2, the added amount of the ultraviolet absorber is preferably in the range of 1.0 parts by mass or more and 15.0 parts by mass or less per 100 parts by mass of the resin of the layer to which the ultraviolet absorber is added. More preferably, the amount is in the range of 2.5 parts by mass or more and 8.0 parts by mass or less. When the compounding amount of the ultraviolet absorber is less than 1.0 parts by mass, stability of the resin to ultraviolet radiation may be poor. On the other hand, when the compounding amount of the ultraviolet absorber is larger than 15.0 parts by mass, bleed out is more likely to occur.

Further, when the top coat layer 2 includes a thermosetting layer and a photocurable layer as described above, it is preferred that a relatively larger amount of the ultraviolet absorber is contained in the thermosetting layer.

The ultraviolet absorber may be at least one selected from the group consisting of, for example, triazine, benzotriazole, benzophenone, benzoate, and cyanoacrylate-based absorbents. In particular, since the triazine-based or benzotriazole-based organic ultraviolet absorber (the compound (1) having a hydroxyphenyl triazine skeleton, or the compound (2) having a benzotriazole skeleton as described above) has high ultraviolet absorption ability, and excellent heat resistance, volatility resistance, and resin miscibility, at least one of these is preferably used. Further, the ultraviolet absorber preferably has a triazine skeleton or benzotriazole skeleton, and a molecular weight of 400 or more. The molecular weight of the ultraviolet absorber may be, for example, a number-average molecular weight measured by known methods, or may be a value derived from the structural formula of the substance.

A gloss adjusting agent may be made of, for example, inorganic particles. Examples of the inorganic particles include silica, clay, calcium carbonate, barium sulfate, alumina white, aluminum hydroxide, talc, bentonite, titanium oxide, white carbon such as silicic anhydride known as colloidal silica, hydrous silicic acid, hydrous calcium silicate, and hydrous aluminum silicate, and alumina sol. Further, surface modification by polydimethylsiloxane, polyethylene wax, or a surfactant is preferred for improvement in dispersibility and stain resistance.

The particle size of the inorganic particles is preferably in the range of 1 μm or more and 20 μm or less. More preferably, the particle size is in the range of 3 μm or more and 10 μm or less. When the particle size is smaller than 1 μm, the gloss adjusting effect may be reduced. On the other hand, when the particle size is larger than 20 μm, filler is likely to be detached from the coat surface. Further, the pH of the inorganic particles dispersed in water is preferably in the vicinity of neutrality, e.g. larger than 5.0 and not more than 8.5. When inorganic particles having a pH of 5.0 or less or larger than 8.5 are used, byproducts may be produced due to the pKa of the photostabilizer.

Since the inorganic particles (gloss adjusting agent) contributes to the design (glossiness) of the decorative sheet 1, an amount according to a desired glossiness is included (added). The added amount of the inorganic particles may be in the range of 1 part by mass or more and 20 parts by mass or less per 100 parts by mass of the main component resin of the top coat layer 2.

Further, in the second embodiment, the protective layer 3 is preferably an olefin resin layer which includes olefin resin as a main component of the resin, and contains 0.3 parts by mass or more and 15.0 parts by mass or less of a compound having pKa of 7.0 or less per 100 parts by mass of the resin material. The compound having the pKa of 7.0 or less may be, for example, the photostabilizer or the ultraviolet absorber contained in the top coat layer 2 described above.

The rest of the configuration is the same as that of the decorative sheet 1 of the first embodiment.

In view of the above, the second embodiment can provide the laminate 9 and the decorative sheet 1 having stable weatherability over a long period of time by adding the photostabilizer having a pKa in the range of 4.0 or more and 7.0 or less in the resin composition which constitutes the top coat layer 2.

Further, in the second embodiment, since the photostabilizer having pKa in the range of 4.0 or more and 7.0 or less is contained in the resin composition of the top coat layer 2, it is possible to prevent reduction in weatherability due to the inorganic particles contained in the top coat layer 2 as the gloss adjusting agent. The reason for this is that, when the photostabilizer has a pKa larger than 7.0, a side reaction is likely to occur due to an acid base reaction in the proximity of the top coat layer 2 in contact with the surface of inorganic particles, and the ratio of the photostabilizer in the top coat layer 2 tends to be decreased. Therefore it is preferred to use photostabilizer having a pKa of 7.0 or less as the photostabilizer added to the top coat layer 2.

Further, in the second embodiment, since the photostabilizer having the pKa in the range of 4.0 or more and 7.0 or less is contained in the resin composition of the top coat layer 2, it is possible to prevent reduction in weatherability due to residual monomer and the like resulting from the material in the top coat layer 2. The reason for this is that, when the photostabilizer has a pKa larger than 7.0, a side reaction is likely to occur due to an acid base reaction in the proximity of the residual monomer, and the ratio of the photostabilizer in the top coat layer 2 tends to be decreased. Therefore it is preferred to use the photostabilizer having a pKa of 7.0 or less.

Further, the second embodiment can provide the laminate 9 including the top coat layer 2 having high weatherability by adding the photostabilizer having a pKa in the range of 4.0 or more and 7.0 or less and the ultraviolet absorber having pKa in the range of −5.5 or more and −4.5 or less when irradiated with light in the resin composition which constitutes the top coat layer 2, and can provide the decorative sheet 1 having stable weatherability, using the laminate 9.

Further, in the second embodiment, since the protective layer 3, which is the substrate of the top coat layer 2, is made of olefin resin, and 0.3 parts by mass or more of the photostabilizer having a pKa of 7.0 or less is added, it is possible to prevent reduction in weatherability of the laminate 9. The reason for this is that, when the photostabilizer has a pKa larger than 7.0, a side reaction is likely to occur due to an acid base reaction in the proximity of the interface between the top coat layer 2 and the protective layer 3, and the ratio of the photostabilizer in the top coat layer 2 in proximity to the protective layer 3 tends to be decreased. Therefore it is preferred to use a photostabilizer having a pKa of 7.0 or less in the olefin resin. More preferably, the pKa is 6.0 or less.

Further, the compound added to the protective layer 3 preferably has a pKa of 7.0 or less.

(Method of Measuring pKa of Photostabilizer)

A solution of 0.1 N perchloric acid/dioxane and acetonitrile:chloroform=1:1 was added dropwise to an organic reference substance having known pKa value in an aqueous system to determine the half neutralization potential (HNP) by titration in a non-aqueous system. A plot of the HNP calibration curve for pKa was prepared. Then, titration was performed for the photostabilizer in the same manner to determine a corresponding pKa from the plot of calibration curve.

(Method of Measuring pH of Silica Particle)

Measurement was performed according to JIS. First, 200 g of purified water was added to 10 g of silica particles dried at 170° C. in atmospheric air for 2 hours, and the mixture was covered with a watch glass. Then, the mixture was heated and stirred at 80±3° C. for 1 hour and cooled to room temperature, and the supernatant was collected. After the supernatant was heated to 25° C., measurement was performed by using an analogue pH meter HM-7J (manufactured by DKK-TOA CORPORATION) which was in conformity to JIS Z8802.

EXAMPLES

Examples of the resin molded product, the laminate, and the decorative sheet according to the present invention are described below.

Example 1

A resin, in which 0.5 parts by mass of hindered phenol-based antioxidant (Irganox 1010; manufactured by BASF Corporation), 0.5 parts by mass of triazine-based ultraviolet absorber (CYASORB UV-1164; manufactured by SUNCHEM), and 0.5 parts by mass of NOR type photostabilizer (Tinuvin XT850 FF; manufactured by BASF Corporation) were added to 100 parts by mass of highly crystalline homopolypropylene resin, was molten extruded by using an extruder to thereby obtain a protective layer 3 in a sheet-shape as a transparent highly crystalline polypropylene sheet with 100 μm thickness. Then, corona treatment was applied on both surfaces of the protective layer 3 thus obtained so that the wetting tension of the sheet surface becomes 40 dyn/cm or higher.

Further, a pattern was printed on one of the surfaces of a 80 μm-thick polyethylene sheet (primary film layer 6) having concealing properties by gravure printing using a two-part type urethane ink (V180; manufactured by Toyo Ink Co., Ltd.) to thereby provide the pattern layer 5a. Further, primer coating was applied on the other of the surfaces of the primary film layer 6.

After that, the protective layer 3 was bonded to the surface of the pattern layer 5a of the primary film layer 6 by a dry lamination method via an adhesive for dry lamination (TAKELAC A540; manufactured by Mitsui Chemicals, Inc., applied amount 2 g/m$^2$). Then embossing was applied on the surface of the bonded protective layer 3 to form an embossed pattern 3a. After the embossed pattern 3a was formed, a two-part type urethane top coat (W184; manufactured by DIC Graphics Corp.) was applied at the applied amount 3 g/m$^2$ and dried to thereby form a top coat layer 2. Thus, a decorative sheet 1 with a total thickness of 188 μm shown in FIG. 1 was obtained.

Thus, the decorative sheet 1 of Example 1 having the top coat layer 2, which includes 2.5 parts by mass of HALS 144 as the hindered amine-based photostabilizer and 2.5 parts by mass of Tinuvin 405 as the ultraviolet absorber in 100 parts by mass of the two-part type urethane top coat, which is a main component of the top coat layer 2, was prepared.

Example 2

The decorative sheet 1 was prepared in the same manner as that of Example 1 except that a triazine-based ultraviolet absorber (LA-F70; manufactured by ADEKA) was used instead of the triazine-based ultraviolet absorber (CYASORB UV-1164) used for the protective layer 3 of Example 1.

Example 3

The decorative sheet 1 was prepared in the same manner as that of Example 1 except that a benzotriazole-based ultraviolet absorber (LA-36; manufactured by ADEKA) was used instead of the triazine-based ultraviolet absorber (CYASORB UV-1164) used for the protective layer 3 of Example 1.

Example 4

The decorative sheet 1 was prepared in the same manner as that of Example 1 except that a benzotriazole-based ultraviolet absorber (Tinuvin326; manufactured by BASF Corporation) was used instead of the triazine-based ultraviolet absorber (CYASORB UV-1164) used for the protective layer 3 of Example 1.

Example 5

The decorative sheet 1 was prepared in the same manner as that of Example 1 except that a NOR type photostabilizer (Tinuvin 123; manufactured by BASF Corporation) was used instead of the NOR type photostabilizer (Tinuvin XT850 FF) used for the protective layer 3 of Example 1.

Example 6

The decorative sheet 1 was prepared in the same manner as that of Example 1 except that a NOR type photostabilizer (LA-81; manufactured by ADEKA) was used instead of the NOR type photostabilizer (Tinuvin XT850 FF) used for the protective layer 3 of Example 1.

Example 7

The decorative sheet 1 was prepared in the same manner as that of Example 1 except that a photostabilizer (Tinuvin 622SF; manufactured by BASF Corporation) was used instead of the NOR type photostabilizer (Tinuvin XT850 FF) used for the protective layer 3 of Example 1.

Example 8

The decorative sheet 1 was prepared in the same manner as that of Example 1 except that 8-acetyl-3-tetradecyl-7,7, 9,9-tetramethyl-1,3,8-triazaspiro[4.5]decane-2,4-dione was used as the photostabilizer instead of the NOR type photostabilizer (Tinuvin XT850 FF) used for the protective layer 3 of Example 1.

Example 9

The decorative sheet 1 was prepared in the same manner as that of Example 1 except that the added amount of the NOR type photostabilizer (Tinuvin XT850 FF) used for the protective layer 3 of Example 1 was increased to 0.75 parts by mass compared with 0.5 parts by mass in Example 1.

Example 10

The decorative sheet 1 was prepared in the same manner as that of Example 1 except that the added amount of the NOR type photostabilizer (Tinuvin XT850 FF) used for the protective layer 3 of Example 1 was increased to 1.0 parts by mass compared with 0.5 parts by mass in Example 1.

Example 11

The decorative sheet 1 was prepared in the same manner as that of Example 1 except that the added amount of the NOR type photostabilizer (Tinuvin XT850 FF) used for the protective layer 3 of Example 1 was increased to 1.5 parts by mass compared with 0.5 parts by mass in Example 1.

Example 12

The decorative sheet 1 was prepared in the same manner as that of Example 1 except that the added amount of the NOR type photostabilizer (Tinuvin XT850 FF) used for the protective layer 3 of Example 1 was increased to 2.0 parts by mass compared with 0.5 parts by mass in Example 1.

Example 13

The decorative sheet 1 was prepared in the same manner as that of Example 1 except that the added amount of the triazine-based ultraviolet absorber (CYASORB UV-1164) used for the protective layer 3 of Example 1 was increased to 1.5 parts by mass compared with 0.5 parts by mass in Example 1, and the added amount of the NOR type photostabilizer (Tinuvin XT850 FF) used for the protective layer was increased to 2.0 parts by mass compared with 0.5 parts by mass in Example 1.

Example 14

A resin, in which 0.5 parts by mass of hindered phenol-based antioxidant (Irganox 1010; manufactured by BASF Corporation), 0.5 parts by mass of triazine-based ultraviolet absorber (CYASORB UV-1164; manufactured by SUNCHEM), and 0.5 parts by mass of NOR type photostabilizer (Tinuvin XT850 FF; manufactured by BASF Corporation) were added to 100 parts by mass of highly crystalline homopolypropylene resin, and maleic anhydride modified polypropylene resin, which were molten extruded by using an extruder to thereby obtain a sheet-shaped protective layer 3 having a two-layer structure composed of a highly crystalline polypropylene sheet and a maleic acid modified polypropylene resin layer. The protective layer 3 had a thickness of 110 μm, composed of the highly crystalline polypropylene sheet with 100 μm thickness and the maleic acid modified polypropylene resin layer with 10 μm thickness. The highly crystalline polypropylene sheet was transparent. Then, corona treatment was applied on both surfaces of the protective layer 3 thus obtained so that the wetting tension of the sheet surface becomes 40 dyn/cm or higher. Further, a pattern was printed on one of the surfaces of a 80 μm-thick polyethylene sheet (primary film layer 6) having concealing properties by gravure printing using a two-part type urethane ink (V180; manufactured by Toyo Ink Co., Ltd.) to thereby provide the pattern layer 5a. Further, primer coating was applied on the other of the surfaces of the primary film layer 6.

After that, the outer surface of the maleic acid modified polypropylene resin layer of the protective layer 3 was bonded to the surface of the pattern layer 5a of the primary film layer 6 by a dry lamination method via an adhesive for dry lamination (TAKELAC A540; manufactured by Mitsui Chemicals, Inc., applied amount 2 g/m$^2$). Then embossing was applied on the surface of the bonded protective layer 3 to form an embossed pattern 3a. After the embossed pattern 3a was formed, a two-part type urethane top coat (W184; manufactured by DIC Graphics Corp.) was applied at the applied amount 3 g/m$^2$ and dried to thereby form a top coat layer 2. Thus, a decorative sheet 1 with a total thickness of 198 μm shown in FIG. 1 was obtained as the decorative sheet 1 of Example 14.

Example 15

The decorative sheet 1 was prepared in the same manner as that of Example 14 except that another triazine-based ultraviolet absorber (LA-F70; manufactured by ADEKA) was used instead of the triazine-based ultraviolet absorber (CYASORB UV-1164) used for the protective layer 3 of Example 14.

Example 16

The decorative sheet 1 was prepared in the same manner as that of Example 14 except that a benzotriazole-based ultraviolet absorber (LA-36; manufactured by ADEKA) was used instead of the triazine-based ultraviolet absorber (CYASORB UV-1164) used for the protective layer 3 of Example 14.

Example 17

The decorative sheet 1 was prepared in the same manner as that of Example 14 except that a benzotriazole-based ultraviolet absorber (Tinuvin326; manufactured by BASF Corporation) was used instead of the triazine-based ultraviolet absorber (CYASORB UV-1164) used for the protective layer 3 of Example 14.

Example 18

The decorative sheet 1 was prepared in the same manner as that of Example 14 except that another NOR type photostabilizer (Tinuvin 123; manufactured by BASF Corporation) was used instead of the NOR type photostabilizer (Tinuvin XT850 FF) used for the protective layer 3 of Example 14.

Example 19

The decorative sheet 1 was prepared in the same manner as that of Example 14 except that another NOR type photostabilizer (LA-81; manufactured by ADEKA) was used instead of the NOR type photostabilizer (Tinuvin XT850 FF) used for the protective layer 3 of Example 14.

Example 20

The decorative sheet 1 was prepared in the same manner as that of Example 14 except that another photostabilizer (Tinuvin 622SF; manufactured by BASF Corporation) was used instead of the NOR type photostabilizer (Tinuvin XT850 FF) used for the protective layer 3 of Example 14.

Example 21

The decorative sheet 1 was prepared in the same manner as that of Example 14 except that 8-acetyl-3-tetradecyl-7,7,9,9-tetramethyl-1,3,8-triazaspiro[4.5]decane-2,4-dione was used as the photostabilizer instead of the NOR type photostabilizer (Tinuvin XT850 FF) used for the protective layer 3 of Example 14.

Example 22

The decorative sheet 1 was prepared in the same manner as that of Example 14 except that the added amount of the NOR type photostabilizer (Tinuvin XT850 FF) used for the protective layer 3 of Example 14 was increased to 0.75 parts by mass compared with 0.5 parts by mass in Example 14.

Example 23

The decorative sheet 1 was prepared in the same manner as that of Example 14 except that the added amount of the NOR type photostabilizer (Tinuvin XT850 FF) used for the protective layer 3 of Example 14 was increased to 1.0 parts by mass compared with 0.5 parts by mass in Example 14.

Example 24

The decorative sheet 1 was prepared in the same manner as that of Example 14 except that the added amount of the NOR type photostabilizer (Tinuvin XT850 FF) used for the protective layer 3 of Example 14 was increased to 1.5 parts by mass compared with 0.5 parts by mass in Example 14.

Example 25

The decorative sheet 1 was prepared in the same manner as that of Example 14 except that the added amount of the NOR type photostabilizer (Tinuvin XT850 FF) used for the protective layer 3 of Example 14 was increased to 2.0 parts by mass compared with 0.5 parts by mass in Example 14.

Example 26

The decorative sheet 1 was prepared in the same manner as that of Example 14 except that the added amount of the triazine-based ultraviolet absorber (CYASORB UV-1164) used for the protective layer 3 of Example 14 was increased to 1.5 parts by mass compared with 0.5 parts by mass in Example 14, and the added amount of the NOR type photostabilizer (Tinuvin XT850 FF) used for the protective layer was increased to 2.0 parts by mass compared with 0.5 parts by mass in Example 14.

Comparative Example 1

The decorative sheet 1 was prepared in the same manner as that of Example 1 except that an NH type photostabilizer (Chimassorb 944; manufactured by BASF Corporation) was used instead of the NOR type photostabilizer (Tinuvin XT850 FF) used for the protective layer 3 of Example 1.

Comparative Example 2

The decorative sheet 1 was prepared in the same manner as that of Example 1 except that an NH type photostabilizer (Chimassorb 770; manufactured by BASF Corporation) was used instead of the NOR type photostabilizer (Tinuvin XT850 FF) used for the protective layer 3 of Example 1.

Comparative Example 3

The decorative sheet 1 was prepared in the same manner as that of Example 1 except that an N—CH3 type photostabilizer (Tinuvin PA144; manufactured by BASF Corporation) was used instead of the NOR type photostabilizer (Tinuvin XT850 FF) used for the protective layer 3 of Example 1.

Comparative Example 4

The decorative sheet 1 was prepared in the same manner as that of Example 4 except that an NH type photostabilizer (Chimassorb 944; manufactured by BASF Corporation) was used instead of the NOR type photostabilizer (Tinuvin XT850 FF) used for the protective layer 3 of Example 4.

Comparative Example 5

The decorative sheet 1 was prepared in the same manner as that of Example 4 except that an NH type photostabilizer (Chimassorb 770; manufactured by BASF Corporation) was used instead of the NOR type photostabilizer (Tinuvin XT850 FF) used for the protective layer 3 of Example 4.

Comparative Example 6

The decorative sheet 1 was prepared in the same manner as that of Example 4 except that an N—CH3 type photostabilizer (Tinuvin PA144; manufactured by BASF Corporation) was used instead of the NOR type photostabilizer (Tinuvin XT850 FF) used for the protective layer 3 of Example 4.

Comparative Example 7

The decorative sheet 1 was prepared in the same manner as that of Example 1 except that the added amount of the triazine-based ultraviolet absorber (CYASORB UV-1164) used for the protective layer 3 of Example 1 was increased to 4.0 parts by mass.

Comparative Example 8

The decorative sheet 1 was prepared in the same manner as that of Example 1 except that the added amount of the NOR type photostabilizer (Tinuvin XT850 FF) used for the protective layer 3 of Example 1 was increased to 4.0 parts by mass.

Comparative Example 9

The decorative sheet 1 was prepared in the same manner as that of Example 1 except that a triazine-based ultraviolet absorber (CYASORB UV-1164) used for the protective layer 3 of Example 1 was not added.

Comparative Example 10

The decorative sheet 1 was prepared in the same manner as that of Example 1 except that an NOR type photostabilizer (Tinuvin XT850 FF) used for the protective layer 3 of Example 1 was not added.

<Evaluation>

(Weatherability (Appearance))

The weatherability test was performed for the resin molded products obtained in Examples 1 to 26 and Comparative Examples 1 to 10. The resin molded products were set on the Metal Weather manufactured by Daipla Wintes Co., Ltd., and left to stand for 20 hours under the light conditions (illumination: 60 mW/cm$^2$, black panel temperature 63° C., inner layer humidity 50% RH), 4 hours under condensation conditions (illumination: 0 mW/cm$^2$, black panel temperature 30° C., inner layer humidity 98% RH), and 300 hours, 500 hours, or 1000 hours under water spray conditions (10 seconds before and after the condensation conditions). After the above test, the resin molded products were held for 2 days under conditions of 25° C. and 50% RH. Then, the appearance such as a cracking on the plate surface and yellowing were evaluated by visual observation under the following criteria.

(Coating Film Appearance)

Excellent: No change from the initial state

Good: Appearance change from the initial state observed, while no cracking occurred Fair: Fine cracks observed on the surface Poor: Many cracks observed on the surface (Substrate Yellowing)

Excellent: No change from the initial state

Good: Slight yellowing from the initial state observed

Fair: Yellowing observed

Poor: Significant yellowing observed

TABLE 1

| | Ultraviolet absorber | | | Photostabilizer | | | |
|---|---|---|---|---|---|---|---|
| | Name | pKa | Added amount (parts by weight) | Name | pKa | Added amount (parts by weight) | pKa difference |
| Example 1 | CYASORB UV-1164 | −5.0 | 0.5 | Tinuvin XT850 FF | 4.5 | 0.5 | 9.5 |
| Example 2 | LA-F70 | −5.3 | 0.5 | Tinuvin XT850 FF | 4.5 | 0.5 | 9.8 |
| Example 3 | LA-36 | −5.1 | 0.5 | Tinuvin XT850 FF | 4.5 | 0.5 | 9.6 |
| Example 4 | Tinuvin 326 | −4.9 | 0.5 | Tinuvin XT850 FF | 4.5 | 0.5 | 9.4 |
| Example 5 | CYASORB UV-1164 | −5.0 | 0.5 | Tinuvin 123 | 4.7 | 0.5 | 9.7 |
| Example 6 | CYASORB UV-1164 | −5.0 | 0.5 | LA-81 | 5.5 | 0.5 | 10.5 |
| Example 7 | CYASORB UV-1164 | −5.0 | 0.5 | Tinuvin 622 SF | 6.5 | 0.5 | 11.5 |
| Example 8 | CYASORB UV-1164 | −5.0 | 0.5 | 8-acetyl-3-tetradecyl-7,7,9,9-tetramethyl-1,3,8-triaza-spiro[4.5]decane-2,4-dione | 3.5 | 0.5 | 8.5 |
| Example 9 | CYASORB UV-1164 | −5.0 | 0.5 | Tinuvin XT850 FF | 4.5 | 0.75 | 9.5 |
| Example 10 | CYASORB UV-1164 | −5.0 | 0.5 | Tinuvin XT850 FF | 4.5 | 1.0 | 9.5 |
| Example 11 | CYASORB UV-1164 | −5.0 | 0.5 | Tinuvin XT850 FF | 4.5 | 1.5 | 9.5 |
| Example 12 | CYASORB UV-1164 | −5.0 | 0.5 | Tinuvin XT850 FF | 4.5 | 2.0 | 9.5 |
| Example 13 | UV-1164 | −5.0 | 1.5 | Tinuvin XT850 FF | 4.5 | 2.0 | 9.5 |

| | Weatherability evaluation | | | | | |
|---|---|---|---|---|---|---|
| | Coating film appearance | | | Substrate yellowing | | |
| | 300 hours | 500 hours | 1000 hours | 300 hours | 500 hours | 1000 hours |
| Example 1 | Excellent | Excellent | Good | Excellent | Excellent | Excellent |
| Example 2 | Excellent | Excellent | Good | Excellent | Excellent | Excellent |
| Example 3 | Excellent | Excellent | Good | Excellent | Excellent | Excellent |
| Example 4 | Excellent | Excellent | Good | Excellent | Excellent | Excellent |
| Example 5 | Excellent | Excellent | Good | Excellent | Excellent | Excellent |
| Example 6 | Excellent | Excellent | Good | Excellent | Excellent | Excellent |
| Example 7 | Excellent | Excellent | Good | Excellent | Excellent | Good |
| Example 8 | Excellent | Excellent | Good | Excellent | Excellent | Good |
| Example 9 | Excellent | Excellent | Good | Excellent | Excellent | Excellent |
| Example 10 | Excellent | Excellent | Good | Excellent | Excellent | Excellent |
| Example 11 | Excellent | Excellent | Good | Excellent | Excellent | Excellent |
| Example 12 | Excellent | Excellent | Good | Excellent | Excellent | Excellent |
| Example 13 | Excellent | Excellent | Good | Excellent | Excellent | Excellent |

TABLE 2

| | Ultraviolet absorber | | | Photostablizer | | | |
|---|---|---|---|---|---|---|---|
| | Name | pKa | Added amount (parts by weight) | Name | pKa | Added amount (parts by weight) | pKa difference |
| Example 14 | CYASORB UV-1164 | −5.0 | 0.5 | Tinuvin XT850 FF | 4.5 | 0.5 | 9.5 |
| Example 15 | LA-F70 | −5.3 | 0.5 | Tinuvin XT850 FF | 4.5 | 0.5 | 9.8 |
| Example 16 | LA-36 | −5.1 | 0.5 | Tinuvin XT850 FF | 4.5 | 0.5 | 9.6 |
| Example 17 | Tinuvin 326 | −4.9 | 0.5 | Tinuvin XT850 FF | 4.5 | 0.5 | 9.4 |
| Example 18 | CYASORB UV-1164 | −5.0 | 0.5 | Tinuvin 123 | 4.7 | 0.5 | 9.7 |
| Example 19 | CYASORB UV-1164 | −5.0 | 0.5 | LA-81 | 5.5 | 0.5 | 10.5 |
| Example 20 | CYASORB UV-1164 | −5.0 | 0.5 | Tinuvin 622 SF | 6.5 | 0.5 | 11.5 |
| Example 21 | CYASORB UV-1164 | −5.0 | 0.5 | 8-acetyl-3-tetradecyl-7,7,9,9-tetramethyl-1,3,8-triaza-spiro[4.5]decane-2,4-dione | 3.5 | 0.5 | 8.5 |
| Example 22 | CYASORB UV-1164 | −5.0 | 0.5 | Tinuvin XT850 FF | 4.5 | 0.75 | 9.5 |
| Example 23 | CYASORB UV-1164 | −5.0 | 0.5 | Tinuvin XT850 FF | 4.5 | 1.0 | 9.5 |
| Example 24 | CYASORB UV-1164 | −5.0 | 0.5 | Tinuvin XT850 FF | 4.5 | 1.5 | 9.5 |
| Example 25 | CYASORB UV-1164 | −5.0 | 0.5 | Tinuvin XT850 FF | 4.5 | 2.0 | 9.5 |
| Example 26 | CYASORB UV-1164 | −5.0 | 1.5 | Tinuvin XT850 FF | 4.5 | 2.0 | 9.5 |

| | Weatherability evaluation | | | | | |
|---|---|---|---|---|---|---|
| | Coating film appearance | | | Substrate yellowing | | |
| | 300 hours | 500 hours | 1000 hours | 300 hours | 500 hours | 1000 hours |
| Example 14 | Excellent | Excellent | Excellent | Excellent | Excellent | Excellent |
| Example 15 | Excellent | Excellent | Excellent | Excellent | Excellent | Excellent |
| Example 16 | Excellent | Excellent | Excellent | Excellent | Excellent | Excellent |
| Example 17 | Excellent | Excellent | Excellent | Excellent | Excellent | Excellent |
| Example 18 | Excellent | Excellent | Excellent | Excellent | Excellent | Excellent |
| Example 19 | Excellent | Excellent | Excellent | Excellent | Excellent | Excellent |
| Example 20 | Excellent | Excellent | Excellent | Excellent | Excellent | Good |
| Example 21 | Excellent | Excellent | Excellent | Excellent | Excellent | Good |
| Example 22 | Excellent | Excellent | Excellent | Excellent | Excellent | Excellent |
| Example 23 | Excellent | Excellent | Excellent | Excellent | Excellent | Excellent |
| Example 24 | Excellent | Excellent | Excellent | Excellent | Excellent | Excellent |
| Example 25 | Excellent | Excellent | Excellent | Excellent | Excellent | Excellent |
| Example 26 | Excellent | Excellent | Good | Excellent | Excellent | Excellent |

TABLE 3

| | Ultraviolet absorber | | | Photostablizer | | | pKa difference | Weatherability evaluation | | | | | |
|---|---|---|---|---|---|---|---|---|---|---|---|---|---|
| | | | | | | | | Coating film appearance | | | Substrate yellowing | | |
| | Name | pKa | Added amount | Name | pKa | Added amount | | 300 | 500 | 1000 | 300 | 500 | 1000 hours |
| Comparative Example 1 | CYASORB UV-1164 | −5.0 | 0.5 | Chimassorb 944 | 9.2 | 0.5 | 14.2 | Fair | Fair | Poor | Fair | Fair | Poor |
| Comparative Example 2 | CYASORB UV-1164 | −5.0 | 0.5 | Chimassorb 770 | 9.0 | 0.5 | 14.0 | Fair | Fair | Poor | Fair | Fair | Poor |
| Comparative Example 3 | CYASORB UV-1164 | −5.0 | 0.5 | Tinuvin PA144 | 9.5 | 0.5 | 14.5 | Fair | Fair | Poor | Fair | Fair | Poor |
| Comparative Example 4 | Tinuvin 326 | −4.9 | 0.5 | Chimassorb 944 | 9.2 | 0.5 | 14.1 | Fair | Fair | Poor | Fair | Fair | Poor |

TABLE 3-continued

| | Ultraviolet absorber | | | Photostablizer | | | pKa difference | Weatherability evaluation | | | | | |
|---|---|---|---|---|---|---|---|---|---|---|---|---|---|
| | | | Added | | | Added | | Coating film appearance | | | Substrate yellowing | | 1000 |
| | Name | pKa | amount | Name | pKa | amount | | 300 | 500 | 1000 | 300 | 500 | hours |
| Comparative Example 5 | Tinuvin 326 | −4.9 | 0.5 | Chimassorb 770 | 9.0 | 0.5 | 13.9 | Fair | Fair | Poor | Fair | Fair | Poor |
| Comparative Example 6 | Tinuvin 326 | −4.9 | 0.5 | Tinuvin PA144 | 9.5 | 0.5 | 14.4 | Fair | Fair | Poor | Fair | Fair | Poor |
| Comparative Example 7 | CYASORB UV-1164 | −5.0 | 4.0 | Tinuvin XT850 FF | 4.5 | 0.5 | 9.5 | Fair | Fair | Poor | Fair | Fair | Poor |
| Comparative Example 8 | CYASORB UV-1164 | −5.0 | 0.5 | Tinuvin XT850 FF | 4.5 | 4.0 | 9.5 | Fair | Fair | Poor | Fair | Fair | Poor |
| Comparative Example 9 | — | — | — | Tinuvin XT850 FF | 4.5 | 0.5 | — | Poor | Poor | Poor | Poor | Poor | Poor |
| Comparative Example 10 | CYASORB UV-1164 | −5.0 | 2.0 | — | — | — | — | Poor | Poor | Poor | Poor | Poor | Poor |

As shown in Table 1, in the decorative sheet 1 of Examples 1 to 13, in which a combination of the ultraviolet absorber having the pKa in the range of −5.5 or more and −4.5 or less when irradiated with light and the photostabilizer having pKa in the range of 3.0 or more and 7.0 or less was added to the resin, the change in glossiness after the weatherability test was reduced without causing haze, and a change in appearance was less likely to occur.

Further, as shown in Table 2, in decorative sheet 1 of Examples 14 to 26, in which an acid modified resin layer was provided on one of the layers in the protective layer 3, using the above combination of the ultraviolet absorber and the photostabilizer improved the weatherability.

On the other hand, as seen from Table 3, when the photostabilizer having the pKa larger than 7.0 was added to the protective layer, the weatherability was poor. Further, when more than 3.0 parts by mass of the ultraviolet absorber and the photostabilizer was added, and when the ultraviolet absorber and the photostabilizer was not added, the weatherability was poor.

From the above results, it was found that the decorative sheets 1 of Examples 1 to 26 according to the present invention had high weatherability and designability.

Then, other examples of the resin molded product, the laminate, and the decorative sheet according to the present invention are described below.

Example 27

First, film formation of the protective layer 3, formation of the pattern layer 5a and the primer coat, bonding of the primary film layer 6 and protective layer 3, and formation of the embossed pattern 3a were performed in the same manner as those of Example 1. Then, a composition for forming a top coat layer A was applied to the protective layer 3 on which the embossed pattern 3a was formed at the applied amount 3 g/m² and dried to thereby form the top coat layer 2 (hereinafter, also referred to as a "top coat layer A"). Thus, the decorative sheet 1 with a total thickness 185 μm shown in FIG. 2 was obtained.

(Composition for Forming Top Coat Layer A)

The composition for forming the top coat layer A was prepared by blending a polymer solution A with the following curing agent, gloss adjusting agent, ultraviolet absorber, and photostabilizer.

Polymer Solution A 80 g of methyl methacrylate and 20 g of 2-hydroxyethyl methacrylate were introduced into a four-necked flask provided with a stirrer, a nitrogen inlet tube, and a reflux condenser, and 70 g of ethyl acetate was added thereto and dissolved. Then, the mixture was stirred in an oil bath under a nitrogen atmosphere. Subsequently, polymerization was initiated by blending 0.2 g of α, α'-azobisisobutyronitrile, and heating and stirring was continued in a 60° C. oil bath for 5 hours. Thus, a colorless and viscous polymer solution A was obtained.

Curing Agent

Product name: DURANATE 24A-100

Compounding amount: 5 parts by mass

Gloss Adjusting Agent (Inorganic Particle)

Product name: P-801 (manufactured by Mizusawa Industrial Chemicals, Ltd.)

Properties: irregular shape, average particle size 6.0 μm, pH 6.8

Compounding amount: 10 parts by mass

Ultraviolet Absorber

Product name: Tinuvin 329 (manufactured by BASF Corporation)

Compounding amount: 2.5 parts by mass

Photostabilizer

Product name: Tinuvin 123 (manufactured by BASF Corporation)

Compounding amount: 1.5 parts by mass

Example 28

The decorative sheet 1 of Example 28 was prepared in the same manner as that of Example 27 except that C-402 (manufactured by Mizusawa Industrial Chemicals, Ltd.) was used instead of the gloss adjusting agent (P-801) used for the top coat layer 2 of Example 27.

Example 29

The decorative sheet 1 of Example 29 was prepared in the same manner as that of Example 27 except that NP-8 (manufactured by Mizusawa Industrial Chemicals, Ltd.) was used instead of the gloss adjusting agent (P-801) used for the top coat layer 2 of Example 27.

Example 30

The decorative sheet 1 of Example 30 was prepared in the same manner as that of Example 27 except that the Tinuvin 152 (manufactured by BASF Corporation) was used instead of the photostabilizer (Tinuvin 123) used for the top coat layer 2 of Example 27.

Example 31

The decorative sheet 1 of Example 31 was prepared in the same manner as that of Example 28 except that the Tinuvin 152 (manufactured by BASF Corporation) was used instead of the photostabilizer (Tinuvin 123) used for the top coat layer 2 of Example 28.

Example 32

The decorative sheet 1 of Example 32 was prepared in the same manner as that of Example 29 except that the Tinuvin 152 (manufactured by BASF Corporation) was used instead of the photostabilizer (Tinuvin 123) used for the top coat layer 2 of Example 29.

Example 33

The decorative sheet 1 of Example 33 was prepared in the same manner as that of Example 27 except that the added amount of the photostabilizer (Tinuvin 123) used for the top coat layer 2 of Example 27 was decreased to 0.5 parts by mass compared with 1.5 parts by mass in Example 27.

Example 34

The decorative sheet 1 of Example 34 was prepared in the same manner as that of Example 27 except that the added amount of the photostabilizer (Tinuvin 123) used for the top coat layer 2 of Example 27 was increased to 3.0 parts by mass compared with 1.5 parts by mass in Example 27.

Example 35

The decorative sheet 1 of Example 35 was prepared in the same manner as that of Example 27 except that the added amount of the photostabilizer (Tinuvin 123) used for the top coat layer 2 of Example 27 was increased to 15.0 parts by mass compared with 1.5 parts by mass in Example 27.

Comparative Examples 11 to 13

The decorative sheet 1 of Comparative Examples 11 to 13 was prepared in the same manner as that of Examples 27 to 29 except that the Tinuvin 292 (manufactured by BASF Corporation) was used instead of the photostabilizer (Tinuvin 123) used for the top coat layer 2 of Example 27 to 29.

Comparative Example 14

The decorative sheet 1 of Comparative Example 14 was prepared in the same manner as that of Example 27 except that the photostabilizer (Tinuvin 123) used for the top coat layer 2 of Example 27 was not added.

Table 4 shows the photostabilizers and the gloss adjusting agents used. Table 4 also shows the evaluation results.

TABLE 4

| | Photostablizer | | | Gloss adjusting agent | | | Coating film appearance Before test | Substrate yellowing After test | | | |
|---|---|---|---|---|---|---|---|---|---|---|---|
| | Name | pKa | Added Amount | Type | pH | Added Amount | 0 hours | 500 hours | 1000 hours | 500 hours | 1000 hours |
| Example 27 | Tinuvin123 | 4.5 | 1.5 parts by mass | Silica A (without surface-treatment) | 6.8 | | Good | Good | Fair | Good | Good |
| Example 28 | | | | Silica B (with surface-treatment) | 8 | | Good | Good | Good | Good | Good |
| Example 29 | | | | Silica C (with surface-treatment) | 7 | | Good | Good | Good | Good | Good |
| Example 30 | Tinuvin 152 | 7.0 | 1.5 parts by mass | Silica A (without surface-treatment) | 6.8 | | Good | Good | Fair | Good | Good |
| Example 31 | | | | Silica B (with surface-treatment) | 8 | | Good | Good | Good | Good | Good |
| Example 32 | | | | Silica C (with surface-treatment) | 7 | | Good | Good | Good | Good | Good |
| Example 33 | Tinuvin123 | 4.5 | 0.5 parts by mass | Silica A (without surface-treatment) | 6.8 | | Good | Good | Fair | Good | Good |
| Example 34 | | | 3.0 parts by mass | | 6.8 | | Good | Good | Good | Good | Good |
| Example 35 | | | 15.0 parts by mass | | 6.8 | | Good | Good | Good | Good | Good |
| Comparative Example 11 | Tinuvin 292 | 8.9 | 1.5 parts by mass | Silica A (without surface-treatment) | 6.8 | | Good | Fair | Poor | Fair | Fair |
| Comparative Example 12 | | | | Silica B (with surface-treatment) | 8.0 | | Good | Fair | Poor | Good | Fair |

TABLE 4-continued

| | Photostablizer | | Gloss adjusting agent | | | Coating film appearance | | | | |
|---|---|---|---|---|---|---|---|---|---|---|
| | | | | | | Before test | | | Substrate yellowing After test | |
| | Name | pKa | Added Amount | Type | pH | Added Amount | 0 hours | 500 hours | 1000 hours | 500 hours | 1000 hours |
| Comparative Example 13 | | | | Silica C (with surface-treatment) | 7.0 | | Good | Fair | Poor | Good | Fair |
| Comparative Example 14 | | | | | 6.8 | | Good | Poor | Poor | Poor | Poor |

Further, the decorative sheet 1 of Examples 36 to 44 was prepared with a top coat layer 2 modified from Example 27.

Example 36

The decorative sheet of Example 36 was prepared having a top coat layer 2 (hereinafter, also referred to as a "top coat layer B") in which the composition for forming the top coat layer B was used instead of the composition for forming the top coat layer A of Example 27.

(Composition for Forming Top Coat Layer B)

The composition for forming the top coat layer B was prepared by blending a resin solution A with the following initiator, gloss adjusting agent, ultraviolet absorber, and photostabilizer.

Resin Solution A

Product Name: M405 (manufactured by Toagosei Co., Ltd.)

Initiator

Product Name: Irgcure 184 (manufactured by BASF Corporation)

Compounding amount: 5 parts by mass

Gloss Adjusting Agent (Inorganic Particle)

Same as Example 27

Ultraviolet Absorber

Same as Example 27

Photostabilizer

Same as Example 27

Example 37

For Example 37, the top coat layer 2 was prepared in the same manner as in Example 27 except that the top coat layer A of Example 27 was coated with a top coat layer 2 (hereinafter also referred to as a "top coat layer C") in which the following polymer solution B was used instead of the polymer solution A of Example 27 to produce a two-layer structure to thereby prepare a decorative sheet 1 of Example 37.

Polymer Solution B 50 g of methyl methacrylate and 50 g of 2-hydroxyethyl methacrylate were introduced into a four-necked flask provided with a stirrer, a nitrogen inlet tube, and a reflux condenser, and 70 g of ethyl acetate was added thereto and dissolved. Then, the mixture was stirred in an oil bath under a nitrogen atmosphere. Subsequently, polymerization was initiated by blending 0.2 g of α, α'-azobisisobutyronitrile, and heating and stirring was continued in a 60° C. oil bath for 5 hours. Thus, a colorless and viscous polymer solution B was obtained.

Example 38

The decorative sheet 1 of Example 38 having a two-layer structure was prepared by coating the top coat layer A of Example 27 with the top coat layer B used in Example 36.

Example 39

The decorative sheet of Example 39 was prepared having the top coat layer 2 (hereinafter, also referred to as a "top coat layer D"), in which a composition for forming the top coat layer D was used instead of the composition for forming the top coat layer A of Example 27.

(Composition for Forming Top Coat Layer D)

The composition for forming the top coat layer D was prepared by blending a resin solution B with the following curing agent, initiator, gloss adjusting agent, ultraviolet absorber, and photostabilizer.

Resin Solution B

The resin solution B was obtained by blending 50 parts by mass of each of the polymer solution A and resin solution A.

Initiator

Product Name: Irgcure 184 (manufactured by BASF Corporation)

Compounding amount: 5 parts by mass

Curing Agent

Product name: DURANATE 24A-100

Compounding amount: 5 parts by mass

Gloss Adjusting Agent (Inorganic Particle)

Same as Example 27

Ultraviolet Absorber

Same as Example 27

Photostabilizer

Same as Example 27

Example 40

The decorative sheet of Example 40 having a two-layer structure was prepared by coating the top coat layer A of Example 27 with the top coat layer D used in Example 39.

Example 41

The decorative sheet of Example 41 having a two-layer structure was prepared by coating the top coat layer D of Example 39 with the top coat layer 2 (hereinafter, also referred to as a "top coat layer E") in which a composition for forming the top coat layer E was used instead of the composition for forming the top coat layer D of Example 39.

(Composition for Forming Top Coat Layer E)

The composition for forming the top coat layer E was prepared by blending a resin solution C with the following curing agent, initiator, gloss adjusting agent, ultraviolet absorber, and photostabilizer.

Resin Solution C

The resin solution C was obtained by blending 20 parts by mass of the polymer solution B and 80 parts by mass of the resin solution A.

Initiator
Same as Example 36
Curing Agent
Same as Example 36
Gloss Adjusting Agent (Inorganic Particle)
Same as Example 27
Ultraviolet Absorber
Same as Example 27
Photostabilizer
Same as Example 27

Example 44

The decorative sheet of Example 44 including a three-layer structure was prepared by coating the top coat layer C of Example 37 with the top coat layer B used in Example 36.

Table 5 shows the layer configurations of the top coat layer 2 of Examples 27, 36 to 44, the photostabilizers and the gloss adjusting agents used. Table 5 also shows the evaluation results.

In the layer configuration of the table, "heat" represents the thermosetting layer, "UV" represents the photocurable layer, and "UV/heat" represents a hybrid layer of the photocurable resin and thermosetting resin.

TABLE 5

|  | Layer configuration | | | Photostabilizer | | | Gloss adjusting agent | | | Coating film appearance | | | Substrate yellowing After test | |
|---|---|---|---|---|---|---|---|---|---|---|---|---|---|---|
|  | First layer | Second layer | Third layer | Name | pKa | Added amount | Type | pH | Added amount | Before Test 0 hours | 500 hours | 1000 hours | 500 hours | 1000 hours |
| Example 27 | TCA Heat/ polymer A | — | — | Tinuvin 123 | 4.5 | 1.5 parts by mass | Silica A (without surface-treatment) | 6.8 | 10 parts by mass | Good | Good | Fair | Good | Good |
| Example 36 | TCB UV/resin solution A | — | — |  |  |  |  |  |  | Good | Good | Good | Good | Good |
| Example 37 | TCC Heat/ Polymer B | TCA Heat/ polymer A | — |  |  |  |  |  |  | Good | Good | Good | Good | Good |
| Example 38 | TCB UV/resin solution A | TCA Heat/ polymer A | — |  |  |  |  |  |  | Good | Good | Good | Good | Good |
| Example 39 | TCD UV/ heat resin solution B | — | — |  |  |  |  |  |  | Good | Good | Good | Good | Good |
| Example 40 | TCD UV/ heat resin solution B | TCA Heat/ polymer A | — |  |  |  |  |  |  | Good | Good | Good | Good | Good |
| Example 41 | TCE UV/ heat resin solution C | TCD UV/ heat resin solution B | — |  |  |  |  |  |  | Good | Good | Good | Good | Good |
| Example 42 | TCB UV/resin solution A | UV/heat resin solution B | — |  |  |  |  |  |  | Good | Good | Good | Good | Good |
| Example 43 | TCB UV/resin solution A | TCD UV/ heat resin solution B | TCA Heat/ polymer A |  |  |  |  |  |  | Good | Good | Good | Good | Good |
| Example 44 | TCB UV/resin solution A | TCC Heat/ Polymer B | TCA Heat/ Polymer A |  |  |  |  |  |  | Good | Good | Good | Good | Good |

Example 42

The decorative sheet of Example 42 having a two-layer structure was prepared by coating the top coat layer D of Example 39 with the top coat layer B used in Example 36.

Example 43

The decorative sheet of Example 43 including a three-layer structure was prepared by coating the top coat layer A of Example 27 with the top coat layers D and B used in Examples 39 and 36, respectively, in this order.

<Evaluation>

(Weatherability (Appearance))

The weatherability test was performed for the decorative sheets 1 obtained in Examples 27 to 44 and Comparative Examples 11 to 14. The decorative sheets were set on a Metal Weather manufactured by Daipla Wintes Co., Ltd, and left to stand for 20 hours under the light conditions, 4 hours under condensation conditions, and 500 hours or 1000 hours under water spray conditions. The light conditions, condensation conditions, and water spray conditions were the same as those used in Examples 1 to 26 and Comparative Examples 1 to 10. After the above test, the resin molded products were held for 2 days under conditions of 25° C. and 50% RH. Then, the appearance such as a cracking on the plate surface and yellowing were evaluated by visual observation under the following criteria.

(Coating Film Appearance)
Good: No appearance change observed
Fair: Fine cracks observed on the surface
Poor: Many cracks observed on the surface
(Substrate Yellowing)
Good: No appearance change observed
Fair: Slight yellowing observed
Poor: Significant yellowing observed As shown in Table 4, in the decorative sheet 1 of Examples 27 to 44, in which a combination of the photostabilizers having pKa in the range of 4.0 or more and 7.0 or less was added to the resin, the change in glossiness after the weatherability test was reduced without causing haze, and a change in appearance was less likely to occur.

Further, as seen from Tables 4 and 5, when the photostabilizer having the pKa larger than 7.0 was added to the surface protective layer, the results were poor for both the coating film appearance and substrate yellowing compared with the case where the photostabilizer having the pKa of 4.0 or more and 7.0 or less was used. Further, when 15.0 parts by mass of the photostabilizer was added, haze occurred at the time of formation of the sheet, whereas the change in appearance and yellowing of resin after the weatherability test were not observed. The reason for this seems to be that the ultraviolet absorber and the photostabilizer were bled out onto the surface protective layer, causing increased haze value. However, the weathering agent was sufficiently included to perform its function.

From the above results, it was found that the decorative sheets 1 of Examples 27 to 44 according to the present invention had high weatherability and designability.

Then, other examples of the resin molded product, the laminate, and the decorative sheet according to the present invention are described below.

First, film formation of the protective layer 3, formation of the pattern layer 5a and the primer coat, bonding of the primary film layer 6 and protective layer 3, and formation of the embossed pattern 3a were performed in the same manner as those of Example 1. Then, a composition for forming a top coat layer F was applied to the protective layer 3 on which the embossed pattern 3a was formed and dried to thereby form the top coat layer 2 (hereinafter, also referred to as a "top coat layer F"). Thus, the decorative sheet 1 with a total thickness 190 μm to 200 μm shown in FIG. 2 was obtained.

In the following examples and comparative examples, the respective top coat layers 2 were formed by using a composition selected from the following compositions for forming the top coat layer.

(Composition for Forming Top Coat Layer F)
As described below, the composition for forming the top coat layer F was composed of a thermosetting composition, a photocurable composition, or a thermosetting/photocurable hybrid composition.

[Thermosetting Composition]
The thermosetting composition was prepared by blending the polymer solution F with the following curing agent, gloss adjusting agent, ultraviolet absorber, and photostabilizer.
Polymer Solution F
80 g of methyl methacrylate and 20 g of 2-hydroxyethyl methacrylate were introduced into a four-necked flask provided with a stirrer, a nitrogen inlet tube, and a reflux condenser, and 100 g of ethyl acetate was added thereto and dissolved. Then, the mixture was stirred in an oil bath under a nitrogen atmosphere. Subsequently, polymerization was initiated by blending 0.2 g of α, α'-azobisisobutyronitrile, and heating and stirring was continued in the 60° C. oil bath for 5 hours. Thus, a colorless and viscous polymer solution F was obtained.
Compounding amount: 80 parts by mass
Curing Agent
Product name: DURANATE 24A-100
Compounding amount: 5 parts by mass
Gloss Adjusting Agent (Inorganic Particle)
Product name: SUNSPHERE H122 (manufactured by AGC Si-Tech Co., Ltd.)
Properties: spherical shape, average particle size 12 μm, pore volume 2 ml/g
Compounding amount: 10 parts by mass
Ultraviolet Absorber
Product name: Tinuvin 400 (manufactured by BASF Corporation)
Compounding amount: 5.0 parts by mass
Photostabilizer
Product name: Tinuvin 123 (manufactured by BASF Corporation)
Compounding amount: 2.0 parts by mass
Dilution Solvent
Product name: Ethyl acetate
Compounding amount: 50 parts by mass

[Photocurable Composition]
The photocurable composition was prepared by blending the following monomer with the following photoinitiator, gloss adjusting agent, and photostabilizer.
Monomer
Product name: Dipentaerythritol hexaacrylate
Compounding amount: 90 parts by mass
Photoinitiator
Product Name: Irgacure 184
Compounding amount: 8 parts by mass
Gloss Adjusting Agent (Inorganic Particle)
Product Name: SYLYSIA 430 (manufactured by Fuji Silysia Chemical Ltd.)
Properties: irregular shape, average particle size 4 μm, pore volume 2.3 ml/g
Compounding amount: 10 parts by mass
Ultraviolet Absorber
Product name: Tinuvin 400 (manufactured by BASF Corporation)
Compounding amount: 5.0 parts by mass
Photostabilizer
Product name: Tinuvin 123 (manufactured by BASF Corporation)
Compounding amount: 2.0 parts by mass
Dilution Solvent
Product name: Ethyl acetate
Compounding amount: 60 parts by mass

[Thermosetting/Photocurable Hybrid Composition]
The thermosetting/photocurable hybrid composition was prepared by blending the polymer solution F and the monomer with the following curing agent, photoinitiator, gloss adjusting agent, ultraviolet absorber, and photostabilizer.
Polymer Solution F
80 g of methyl methacrylate and 20 g of 2-hydroxyethyl methacrylate were introduced into a four-necked flask provided with a stirrer, a nitrogen inlet tube, and a reflux condenser, and 100 g of ethyl acetate was added thereto and dissolved. Then, the mixture was stirred in an oil bath under a nitrogen atmosphere. Subsequently, polymerization was initiated by blending 0.2 g of α, α'-azobisisobutyronitrile, and heating and stirring was continued in the 60° C. oil bath for 5 hours. Thus, a colorless and viscous polymer solution F was obtained.

Compounding amount: 40 parts by mass
Monomer
Product name: Dipentaerythritol hexaacrylate
Compounding amount: 40 parts by mass
Curing Agent
Product name: DURANATE 24A-100
Compounding amount: 10 parts by mass
Photoinitiator
Product Name: Irgacure 184
Compounding amount: 10 parts by mass
Gloss Adjusting Agent (Inorganic Particle)
Product name: SUNSPHERE H122 (manufactured by AGC Si-Tech Co., Ltd.)
Properties: spherical shape, average particle size 12 μm, pore volume 2 ml/g
Compounding amount: 10 parts by mass
Ultraviolet Absorber
Product name: Tinuvin 400 (manufactured by BASF Corporation)
Compounding amount: 5.0 parts by mass
Photostabilizer
Product name: Tinuvin 123 (manufactured by BASF Corporation)
Compounding amount: 2.0 parts by mass
Dilution Solvent
Product name: Ethyl acetate
Compounding amount: 50 parts by mass Example 45

The decorative sheet 1 of Example 45 having the layer thickness 190 μm was obtained by applying the thermosetting composition (dry amount 10 g/m$^2$) as the top coat layer 2.

Example 46

The decorative sheet 1 of Example 46 was prepared in the same manner as that of Example 45 except that Tinuvin 329 (manufactured by BASF Corporation) was used instead of the ultraviolet absorber (Tinuvin 400) in the thermosetting composition of Example 45.

Example 47

The decorative sheet 1 of Example 47 was prepared in the same manner as that of Example 45 except that Tinuvin 152 (manufactured by BASF Corporation) was used instead of the photostabilizer (Tinuvin 123) in the thermosetting composition of Example 45.

Example 48

The decorative sheet 1 of Example 48 having a layer thickness 190 μm was obtained by applying the photocurable composition (dry amount 10 g/m$^2$) as the top coat layer 2.

Example 49

The decorative sheet 1 of Example 49 having a layer thickness 190 μm was obtained by applying the thermosetting/photocurable hybrid composition (dry amount 10 g/m$^2$) as the top coat layer 2.

Example 50

The decorative sheet 1 of Example 50 having a total thickness 195 μm was obtained by forming the top coat layer 2 composed of two layers, a thermosetting layer and a photocurable layer, by laminating the thermosetting composition (dry amount 10 g/m$^2$) and the photocurable composition (dry amount 5 g/m$^2$) in this order as the top coat layer 2.

Example 51

The decorative sheet 1 of Example 51 having a total thickness 195 μm was obtained by forming the top coat layer 2 composed of two layers, a thermosetting layer and a thermosetting/photocurable hybrid layer, by laminating the thermosetting composition (dry amount 10 g/m$^2$) and the thermosetting/photocurable hybrid composition (dry amount 5 g/m$^2$) in this order as the top coat layer 2.

Example 52

The decorative sheet 1 of Example 52 having a total thickness 200 μm was obtained by forming the top coat layer 2 composed of three layers of the thermosetting layer, the thermosetting/photocurable hybrid layer, and the photocurable layer by laminating the thermosetting composition (dry amount 10 g/m$^2$), the thermosetting/photocurable hybrid composition (dry amount 5 g/m$^2$) and the photocurable composition (dry amount 5 g/m$^2$) in this order as the top coat layer 2.

Comparative Example 15

The decorative sheet of Comparative Example 15 was prepared in the same manner as that of Example 45 except that Tinuvin 329 (manufactured by BASF Corporation) was used instead of the ultraviolet absorber (Tinuvin 400) in the thermosetting composition and Tinuvin 292 (manufactured by BASF Corporation) was used instead of the photostabilizer (Tinuvin 123) of Example 45.

Table 6 show the ultraviolet absorbers and the photostablizers used. Table 6 also show the evaluation results.

TABLE 6

|  | Layer configuration | Ultraviolet absorber | | | |
|---|---|---|---|---|---|
|  |  | Name | pKa | Molecular weight | Added Amount |
| Example 45 | Thermosetting layer | Tinuvin 400 | −4.5 | 647 | 5.0 parts by mass |
| Example 46 | Thermosetting layer | Tinuvin 329 | −4.9 | 323 | 5.0 parts by mass |
| Example 47 | Thermosetting layer | Tinuvin 400 | −4.5 | 647 | 5.0 parts by mass |

TABLE 6-continued

| Example | Layer designation | Layer type | Name | pKa | Molecular weight | Added amount |
|---|---|---|---|---|---|---|
| Example 48 | | Photocurable layer | Tinuvin 400 | −4.5 | 647 | 5.0 parts by mass |
| Example 49 | | Thermosetting/ photocurable hybrid layer | Tinuvin 400 | −4.5 | 647 | 5.0 parts by mass |
| Example 50 | First layer | Thermosetting layer | Tinuvin 400 | −4.5 | 647 | |
| | Second layer | Photocurable layer | Tinuvin 400 | −4.5 | 647 | |
| Example 51 | First layer | Thermosetting layer | Tinuvin 400 | −4.5 | 647 | |
| | Second layer | Thermosetting/ photocurable hybrid layer | Tinuvin 400 | −4.5 | 647 | |
| Example 52 | First layer | Thermosetting layer | Tinuvin 400 | −4.5 | 647 | |
| | Second layer | Thermosetting/ photocurable hybrid layer | Tinuvin 400 | −4.5 | 647 | |
| | Third layer | Photocurable layer | Tinuvin 400 | −4.5 | 647 | |

| | Photostabilizer | | | | Weatherability (coating film appearance) | | Weatherability (substrate yellowing) | |
|---|---|---|---|---|---|---|---|---|
| | Name | pKa | Molecular weight | Added Amount | | | | |
| Example 45 | Tinuvin 123 | 4.7 | 737 | 2.0 parts by mass | Good | Good | Good | Good |
| Example 46 | Tinuvin 123 | 4.7 | 737 | 2.0 parts by mass | Good | Fair | Good | Good |
| Example 47 | Tinuvin 152 | 7.0 | 757 | 2.0 parts by mass | Good | Good | Good | Good |
| Example 48 | Tinuvin 123 | 4.7 | 737 | 2.0 parts by mass | Good | Good | Good | Good |
| Example 49 | Tinuvin 123 | 4.7 | 737 | 2.0 parts by mass | Good | Good | Good | Good |
| Example 50 | 5.0 parts by mass | 4.7 | 737 | 2.0 parts by mass | Good | Good | Good | Good |
| | 5.0 parts by mass | 4.7 | 737 | 2.0 parts by mass | Good | Good | Good | Good |
| Example 51 | 5.0 parts by mass | 4.7 | 737 | 2.0 parts by mass | Good | Good | Good | Good |
| | 5.0 parts by mass | 4.7 | 737 | 2.0 parts by mass | Good | Good | Good | Good |
| Example 52 | 5.0 parts by mass | 4.7 | 737 | 2.0 parts by mass | Good | Good | Good | Good |
| | 5.0 parts by mass | 4.7 | 737 | 2.0 parts by mass | Good | Good | Good | Good |
| | 5.0 parts by mass | 4.7 | 737 | 2.0 parts by mass | Good | Good | Good | Good |

What is claimed is:

1. A laminate, comprising: a plurality of resin layers, wherein a photostabilizer having pKa of 4.0 or more and 7.0 or less is included in a top coat layer which is disposed on an outermost surface of the laminate, wherein the top coat layer includes a thermosetting layer and a photocurable layer formed on the thermosetting layer.

2. The laminate of claim 1, wherein the top coat layer includes a photostabilizer having pKa of 4.0 or more and 7.0 or less, and an ultraviolet absorber having pKa of −5.5 or more and −4.5 or less when irradiated with light.

3. The laminate of claim 2, wherein the ultraviolet absorber has a triazine skeleton or a benzotriazole skeleton, and a molecular weight of 400 or more.

4. The laminate of claim 1, wherein the photostabilizer is a hindered amine-based photostabilizer.

5. The laminate of claim 4, wherein the photostabilizer is a hindered amine-based photostabilizer having an amino ether group and a molecular weight of 600 or more.

6. The laminate of claim 1, wherein the top coat layer includes a gloss adjusting agent composed of inorganic particles.

7. The laminate of claim 6, wherein the inorganic particles, when dispersed in water, have pH which is greater than 5.0 and not more than 8.5.

8. The laminate of claim 1, further comprising an olefin resin layer, which is a resin layer including an olefin resin as a main component, and including 0.3 parts by mass or more of a compound having pKa of 7.0 or less per 100 parts by mass of resin material, and the top coat layer is formed on the olefin resin layer.

9. A decorative sheet comprising the laminate of claim 1.

10. A laminate, comprising: a plurality of resin layers, wherein a photostabilizer having pKa of 4.0 or more and 7.0 or less is included in a top coat layer which is disposed on an outermost surface of the laminate, wherein the top coat layer includes a gloss adjusting agent composed of inorganic particles, and wherein the inorganic particles, when dispersed in water, have pH which is greater than 5.0 and not more than 8.5.

11. The laminate of claim 10, wherein the top coat layer includes a photostabilizer having pKa of 4.0 or more and 7.0 or less, and an ultraviolet absorber having pKa of −5.5 or more and −4.5 or less when irradiated with light.

12. The laminate of claim 11, wherein the ultraviolet absorber has a triazine skeleton or a benzotriazole skeleton, and a molecular weight of 400 or more.

13. The laminate of claim 10, wherein the photostabilizer is a hindered amine-based photostabilizer.

14. The laminate of claim 13, wherein the photostabilizer is a hindered amine-based photostabilizer having an amino ether group and a molecular weight of 600 or more.

15. The laminate of claim 10, further comprising an olefin resin layer, which is a resin layer including an olefin resin as a main component, and including 0.3 parts by mass or more of a compound having pKa of 7.0 or less per 100 parts by mass of resin material, and the top coat layer is formed on the olefin resin layer.

16. A decorative sheet comprising the laminate of claim 10.

\* \* \* \* \*